US007502656B2

(12) United States Patent
Thibault et al.

(10) Patent No.: US 7,502,656 B2
(45) Date of Patent: *Mar. 10, 2009

(54) METHODS AND APPARATUS FOR REMOTE PROCESS CONTROL

(75) Inventors: Richard L. Thibault, Wrentham, MA (US); Bruce S. Canna, Mansfield, MA (US); Gerald S. Couper, Pepperell, MA (US)

(73) Assignee: Invensys Systems, Inc., Foxboro, MA (US)

( * ) Notice: Subject to any disclaimer, the term of this patent is extended or adjusted under 35 U.S.C. 154(b) by 675 days.

This patent is subject to a terminal disclaimer.

(21) Appl. No.: 10/765,006

(22) Filed: Jan. 26, 2004

(65) Prior Publication Data

US 2004/0230643 A1 Nov. 18, 2004

Related U.S. Application Data

(63) Continuation of application No. 09/379,074, filed on Aug. 23, 1999, now Pat. No. 6,799,195, which is a continuation of application No. 08/700,199, filed on Aug. 20, 1996, now abandoned.

(51) Int. Cl.
*G05B 15/00* (2006.01)
(52) U.S. Cl. .......................... 700/83; 709/203
(58) Field of Classification Search ................. 709/220, 709/226; 700/237
See application file for complete search history.

(56) References Cited

U.S. PATENT DOCUMENTS

| 3,096,434 A | 7/1963 | King |
| 3,404,264 A | 10/1968 | Kugler |
| 3,701,280 A | 10/1972 | Stroman |

(Continued)

FOREIGN PATENT DOCUMENTS

EP 0 411 869 A3 7/1990

(Continued)

OTHER PUBLICATIONS

Mark R. Brown, Using Netscape 2, 1995.*

(Continued)

*Primary Examiner*—Thong H Vu
(74) *Attorney, Agent, or Firm*—Nutter McClennen & Fish LLP; David J. Powsner; Joshua T. Matt (57) ABSTRACT

A system for process control comprises a server digital data processor and a client digital data processor that are coupled by a network, such as the Internet or an Intranet. The server digital data processor, which is additionally coupled to a control/sensing device and any associated interface equipment (collectively, referred to as "process control apparatus"), includes a command processor that transfers information between the network and the process control apparatus. The client digital data processor includes an information client (e.g., a so-called Internet web browser) capable of requesting and receiving an applet from the server digital data processor. The information client, further, defines a hardware-independent and operating system-independent virtual machine environment within the client digital data processor. The client digital data processor executes, within that virtual machine environment, an applet for configuring the client digital data processor as a "process controller" that establishes communications over the network with the command processor and that monitors and/or controls the process control apparatus via those communications.

98 Claims, 2 Drawing Sheets

U.S. PATENT DOCUMENTS

| | | |
|---|---|---|
| 3,810,119 A | 5/1974 | Zieve et al. |
| 3,825,905 A | 7/1974 | Allen, Jr. |
| RE29,383 E | 9/1977 | Gallatin et al. |
| 4,058,975 A | 11/1977 | Gilbert et al. |
| 4,096,566 A | 6/1978 | Borie et al. |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,351,023 A | 9/1982 | Richer |
| 4,377,000 A | 3/1983 | Staab |
| 4,410,942 A | 10/1983 | Milligan et al. |
| 4,423,486 A | 12/1983 | Berner |
| 4,428,044 A | 1/1984 | Liron |
| 4,435,762 A | 3/1984 | Milligan et al. |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,530,234 A | 7/1985 | Cullick et al. |
| 4,609,995 A | 9/1986 | Hasebe |
| 4,615,001 A | 9/1986 | Hudgins, Jr. |
| 4,628,437 A | 12/1986 | Poschmann et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Deyesso et al. |
| 4,740,955 A | 4/1988 | Litterer et al. |
| 4,742,349 A | 5/1988 | Miesterfeld et al. |
| 4,750,109 A | 6/1988 | Kita |
| 4,790,762 A | 12/1988 | Harms et al. |
| 4,805,107 A | 2/1989 | Kieckhafer |
| 4,816,996 A | 3/1989 | Hill et al. |
| 4,817,094 A | 3/1989 | Lebizay et al. |
| 4,872,106 A | 10/1989 | Slater |
| 4,896,290 A | 1/1990 | Rhodes et al. |
| 4,897,777 A | 1/1990 | Janke et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,934,196 A | 6/1990 | Romano |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean |
| 4,991,076 A | 2/1991 | Zifferer et al. |
| 4,991,170 A | 2/1991 | Kern |
| 5,008,805 A | 4/1991 | Fiebig et al. |
| 5,050,165 A | 9/1991 | Yoshioka et al. |
| 5,068,778 A | 11/1991 | Kosem et al. |
| 5,122,948 A | 6/1992 | Zapolin |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,146,589 A | 9/1992 | Peet, Jr. et al. |
| 5,150,289 A | 9/1992 | Badavas |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,166,685 A | 11/1992 | Campbell, Jr. et al. |
| 5,168,276 A | 12/1992 | Huston et al. |
| 5,175,698 A | 12/1992 | Barbanell |
| 5,175,829 A | 12/1992 | Stumpf et al. |
| 5,193,175 A | 3/1993 | Cutts, Jr. et al. |
| 5,212,784 A | 5/1993 | Sparks |
| 5,233,615 A | 8/1993 | Goetz |
| 5,245,704 A | 9/1993 | Weber et al. |
| 5,255,367 A | 10/1993 | Bruckert et al. |
| 5,258,999 A | 11/1993 | Wernimont et al. |
| 5,271,013 A | 12/1993 | Gleeson |
| 5,283,729 A | 2/1994 | Lloyd |
| 5,289,365 A | 2/1994 | Caldwell et al. |
| 5,291,390 A | 3/1994 | Satou |
| 5,295,258 A | 3/1994 | Jewett et al. |
| 5,295,263 A | 3/1994 | Kojima et al. |
| 5,297,143 A | 3/1994 | Fridrich et al. |
| 5,301,346 A | 4/1994 | Notarianni et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,372 A | 4/1994 | Sawyer et al. |
| 5,307,463 A | 4/1994 | Hyatt et al. |
| 5,310,998 A | 5/1994 | Okuno |
| 5,317,726 A | 5/1994 | Horst |
| 5,325,339 A | 6/1994 | Yost et al. |
| 5,327,144 A * | 7/1994 | Stilp et al. .................. 342/387 |
| 5,335,221 A | 8/1994 | Snowbarger et al. |
| 5,339,362 A | 8/1994 | Harris |
| 5,339,680 A | 8/1994 | Bronkal et al. |
| 5,347,181 A | 9/1994 | Ashby et al. |
| 5,349,343 A | 9/1994 | Oliver |
| 5,352,033 A | 10/1994 | Gresham et al. |
| 5,359,721 A | 10/1994 | Kempf et al. |
| 5,371,895 A | 12/1994 | Bristol |
| 5,381,529 A | 1/1995 | Matsushima |
| 5,384,910 A | 1/1995 | Torres |
| 5,386,373 A | 1/1995 | Keeler et al. |
| 5,386,417 A | 1/1995 | Daugherty et al. |
| 5,390,321 A | 2/1995 | Proesel |
| 5,392,280 A | 2/1995 | Zheng |
| 5,398,331 A | 3/1995 | Huang et al. |
| 5,400,140 A | 3/1995 | Johnston |
| 5,410,492 A | 4/1995 | Gross et al. |
| 5,410,717 A | 4/1995 | Floro |
| 5,421,017 A | 5/1995 | Scholz et al. |
| 5,426,732 A | 6/1995 | Boies et al. |
| 5,428,769 A | 6/1995 | Glaser et al. |
| 5,428,781 A | 6/1995 | Duault et al. |
| 5,434,952 A | 7/1995 | Yen et al. |
| 5,434,997 A | 7/1995 | Landry et al. |
| 5,437,007 A | 7/1995 | Bailey et al. |
| 5,440,237 A | 8/1995 | Brown et al. |
| 5,442,791 A * | 8/1995 | Wrabetz et al. ............. 709/330 |
| 5,444,851 A | 8/1995 | Woest |
| 5,444,861 A | 8/1995 | Adamec et al. |
| 5,450,403 A | 9/1995 | Ichii et al. |
| 5,450,425 A | 9/1995 | Gunn et al. |
| 5,450,764 A | 9/1995 | Johnston |
| 5,451,939 A | 9/1995 | Price |
| 5,457,797 A | 10/1995 | Butterworth et al. |
| 5,459,825 A | 10/1995 | Anderson et al. |
| 5,459,839 A | 10/1995 | Swarts et al. |
| 5,463,735 A | 10/1995 | Pascucci et al. |
| 5,467,264 A | 11/1995 | Rauch et al. |
| 5,469,570 A | 11/1995 | Shibata |
| 5,475,856 A | 12/1995 | Kogge |

| Patent No. | | Date | Inventor(s) |
|---|---|---|---|
| 5,481,715 A | | 1/1996 | Hamilton et al. |
| 5,481,741 A | | 1/1996 | McKaskle |
| 5,483,660 A | | 1/1996 | Yishay et al. |
| 5,485,617 A | | 1/1996 | Stutz et al. |
| 5,485,620 A | | 1/1996 | Sadre et al. |
| 5,490,276 A | | 2/1996 | Doli, Jr. et al. |
| 5,491,625 A | | 2/1996 | Pressnall et al. |
| 5,491,791 A | | 2/1996 | Glowney et al. |
| 5,493,534 A | | 2/1996 | Mok |
| 5,499,023 A | | 3/1996 | Goldschmidt |
| 5,499,365 A | | 3/1996 | Anderson et al. |
| 5,501,608 A | | 3/1996 | Scheer et al. |
| 5,504,895 A | | 4/1996 | Kurosawa et al. |
| 5,504,902 A | | 4/1996 | McGrath et al. |
| 5,509,811 A | | 4/1996 | Homic |
| 5,513,095 A | | 4/1996 | Pajonk |
| 5,513,192 A | | 4/1996 | Janku et al. |
| 5,513,354 A | | 4/1996 | Dwork et al. |
| 5,517,655 A | | 5/1996 | Collins et al. |
| 5,519,701 A | | 5/1996 | Colmant et al. |
| 5,522,044 A | | 5/1996 | Pascucci et al. |
| 5,526,353 A | | 6/1996 | Henley et al. |
| 5,530,643 A | | 6/1996 | Hodorowski |
| 5,530,868 A | | 6/1996 | Record et al. |
| 5,531,328 A | | 7/1996 | Rochelo et al. |
| 5,534,912 A | | 7/1996 | Kostreski |
| 5,539,638 A | | 7/1996 | Keeler et al. |
| 5,539,909 A | | 7/1996 | Tanaka et al. |
| 5,541,810 A | | 7/1996 | Donhauser et al. |
| 5,544,008 A | | 8/1996 | Dimmick et al. |
| 5,544,321 A | * | 8/1996 | Theimer et al. ............ 709/226 |
| 5,548,528 A | | 8/1996 | Keeler et al. |
| 5,550,980 A | | 8/1996 | Pascucci et al. |
| 5,551,047 A | | 8/1996 | Mori et al. |
| 5,555,213 A | | 9/1996 | DeLong |
| 5,555,437 A | | 9/1996 | Packer |
| 5,555,510 A | | 9/1996 | Verseput et al. |
| 5,559,963 A | | 9/1996 | Gregg et al. |
| 5,561,770 A | * | 10/1996 | de Bruijn et al. .......... 709/225 |
| 5,563,400 A | | 10/1996 | Le Roux |
| 5,564,055 A | | 10/1996 | Asnaashari et al. |
| 5,568,378 A | | 10/1996 | Wojsznis |
| 5,570,300 A | | 10/1996 | Henry et al. |
| 5,572,643 A | * | 11/1996 | Judson ...................... 709/218 |
| 5,572,673 A | | 11/1996 | Shurts |
| 5,576,946 A | | 11/1996 | Bender et al. |
| 5,579,487 A | | 11/1996 | Meyerson et al. |
| 5,581,760 A | | 12/1996 | Atkinson et al. |
| 5,586,066 A | | 12/1996 | White et al. |
| 5,586,112 A | | 12/1996 | Tabata |
| 5,586,156 A | | 12/1996 | Gaubatz |
| 5,586,329 A | | 12/1996 | Knudsen et al. |
| 5,586,330 A | | 12/1996 | Knudsen et al. |
| 5,587,899 A | | 12/1996 | Ho et al. |
| 5,594,899 A | | 1/1997 | Knudsen et al. |
| 5,596,752 A | | 1/1997 | Knudsen et al. |
| 5,598,536 A | | 1/1997 | Slaughter, III et al. |
| 5,600,845 A | | 2/1997 | Gilson |
| 5,604,737 A | | 2/1997 | Iwami et al. |
| 5,604,871 A | | 2/1997 | Pecone |
| 5,608,607 A | | 3/1997 | Dittmer |
| 5,608,608 A | | 3/1997 | Flint et al. |
| 5,611,057 A | | 3/1997 | Precone et al. |
| 5,613,148 A | | 3/1997 | Bezviner et al. |
| 5,613,164 A | | 3/1997 | DiAngelo et al. |
| 5,613,190 A | | 3/1997 | Hylton |
| 5,617,540 A | | 4/1997 | Civanlar et al. |
| 5,621,890 A | | 4/1997 | Notarianni et al. |
| 5,623,670 A | | 4/1997 | Bohannon et al. |
| 5,627,979 A | | 5/1997 | Chang et al. |
| 5,629,872 A | | 5/1997 | Gross et al. |
| 5,629,949 A | | 5/1997 | Zook |
| 5,630,056 A | | 5/1997 | Horvath et al. |
| 5,630,152 A | | 5/1997 | DeLuca et al. |
| 5,642,259 A | | 6/1997 | Ma |
| 5,642,511 A | | 6/1997 | Chow et al. |
| 5,648,768 A | * | 7/1997 | Bouve ........................ 340/988 |
| 5,649,121 A | | 7/1997 | Budman et al. |
| 5,655,092 A | | 8/1997 | Ojala |
| 5,659,680 A | | 8/1997 | Cunningham et al. |
| 5,664,101 A | | 9/1997 | Picache |
| 5,664,168 A | | 9/1997 | Yishay et al. |
| 5,671,374 A | | 9/1997 | Postman et al. |
| 5,676,141 A | | 10/1997 | Hollub |
| 5,680,404 A | | 10/1997 | Gray |
| 5,680,409 A | | 10/1997 | Qin et al. |
| 5,682,317 A | | 10/1997 | Keeler et al. |
| 5,682,476 A | | 10/1997 | Tapperson et al. |
| 5,687,316 A | | 11/1997 | Graziano et al. |
| 5,700,090 A | | 12/1997 | Eryurek |
| 5,701,414 A | | 12/1997 | Cheng et al. |
| 5,701,484 A | * | 12/1997 | Artsy ......................... 719/316 |
| 5,704,011 A | | 12/1997 | Hansen et al. |
| 5,706,502 A | * | 1/1998 | Foley et al. ................ 707/10 |
| 5,708,709 A | * | 1/1998 | Rose ........................... 705/59 |
| 5,708,779 A | | 1/1998 | Graziano et al. |
| 5,713,045 A | | 1/1998 | Berdahl |
| 5,715,178 A | | 2/1998 | Scarola et al. |
| 5,716,221 A | | 2/1998 | Kantner |
| 5,717,880 A | | 2/1998 | Imai et al. |
| 5,727,128 A | | 3/1998 | Morrison |
| 5,732,218 A | | 3/1998 | Bland et al. |
| 5,734,902 A | | 3/1998 | Atkins et al. |
| 5,737,529 A | | 4/1998 | Dolin, Jr. et al. |
| 5,742,596 A | | 4/1998 | Baratz et al. |
| 5,742,762 A | | 4/1998 | Scholl et al. |
| 5,746,511 A | | 5/1998 | Eryurek et al. |
| 5,748,467 A | | 5/1998 | Qin et al. |
| 5,748,912 A | | 5/1998 | Lee |
| 5,752,007 A | | 5/1998 | Morrison |
| 5,752,008 A | | 5/1998 | Bowling |
| 5,752,246 A | | 5/1998 | Rogers et al. |
| 5,754,772 A | | 5/1998 | Leaf |
| 5,758,073 A | | 5/1998 | Liang et al. |
| 5,758,075 A | | 5/1998 | Graziano et al. |
| 5,761,033 A | | 6/1998 | Wilhelm |
| 5,761,090 A | | 6/1998 | Gross et al. |
| 5,761,405 A | | 6/1998 | Tadamura et al. |
| 5,761,421 A | * | 6/1998 | Van Hoff et al. ............ 709/223 |
| 5,764,906 A | | 6/1998 | Edelstein et al. |
| 5,768,119 A | | 6/1998 | Havekost et al. |
| 5,768,510 A | | 6/1998 | Gish |
| 5,774,378 A | | 6/1998 | Yang |
| 5,774,670 A | | 6/1998 | Montulli |
| 5,777,874 A | | 7/1998 | Flood et al. |
| 5,787,247 A | * | 7/1998 | Norin et al. ................ 709/220 |
| 5,787,272 A | | 7/1998 | Gupta et al. |
| 5,790,791 A | | 8/1998 | Chong et al. |
| 5,793,963 A | | 8/1998 | Tapperson et al. |
| 5,794,071 A | | 8/1998 | Watanabe et al. |
| 5,796,602 A | | 8/1998 | Wellan et al. |
| 5,797,038 A | | 8/1998 | Crawford et al. |
| 5,801,770 A | | 9/1998 | Paff et al. |
| 5,801,942 A | | 9/1998 | Nixon et al. |
| 5,802,389 A | | 9/1998 | McNutt |
| 5,805,442 A | * | 9/1998 | Crater et al. ................ 700/9 |
| 5,805,922 A | | 9/1998 | Sim et al. |
| 5,812,394 A | | 9/1998 | Lewis et al. |
| 5,815,659 A | | 9/1998 | Umetsu et al. |
| 5,822,220 A | | 10/1998 | Baines |
| 5,828,567 A | | 10/1998 | Eryurek et al. |
| 5,828,851 A | | 10/1998 | Nixon et al. |
| 5,831,669 A | | 11/1998 | Adrain |
| 5,832,268 A | | 11/1998 | Anderson et al. |
| 5,835,704 A | | 11/1998 | Li et al. |
| 5,835,724 A | | 11/1998 | Smith |

| | | | |
|---|---|---|---|
| 5,838,910 A * | 11/1998 | Domenikos et al. ......... 709/203 |
| 5,841,360 A | 11/1998 | Binder |
| 5,841,654 A | 11/1998 | Verissimo et al. |
| 5,841,963 A | 11/1998 | Nakamikawa et al. |
| 5,841,991 A | 11/1998 | Russell |
| 5,844,601 A | 12/1998 | McPheely et al. |
| 5,844,796 A | 12/1998 | Araki |
| 5,844,804 A | 12/1998 | Schussler |
| 5,847,957 A | 12/1998 | Cohen et al. |
| 5,854,750 A | 12/1998 | Phillips et al. |
| 5,854,944 A | 12/1998 | Catherwood et al. |
| 5,862,052 A | 1/1999 | Nixon et al. |
| 5,864,773 A | 1/1999 | Barna et al. |
| 5,867,704 A | 2/1999 | Tanaka et al. |
| 5,872,992 A | 2/1999 | Tietjen et al. |
| 5,873,089 A | 2/1999 | Regache |
| 5,874,990 A | 2/1999 | Kato |
| 5,875,430 A * | 2/1999 | Koether ......................... 705/1 |
| 5,876,122 A | 3/1999 | Eryurek |
| 5,880,775 A | 3/1999 | Ross |
| 5,903,455 A * | 5/1999 | Sharpe et al. ................. 700/83 |
| 5,905,963 A * | 5/1999 | Lysejko ...................... 455/557 |
| 5,909,586 A | 6/1999 | Anderson |
| 5,917,840 A | 6/1999 | Cheney et al. |
| 5,919,247 A * | 7/1999 | Van Hoff et al. ............ 709/217 |
| 5,922,050 A * | 7/1999 | Madany ...................... 709/222 |
| 5,928,345 A | 7/1999 | Tetzlaff et al. |
| 5,930,768 A | 7/1999 | Hooban |
| 5,940,839 A | 8/1999 | Chen et al. |
| 5,946,487 A * | 8/1999 | Dangelo ..................... 717/148 |
| 5,956,484 A * | 9/1999 | Resenberg et al. ......... 709/203 |
| 5,956,487 A | 9/1999 | Venkatraman et al. |
| 5,960,205 A | 9/1999 | Mao et al. |
| 5,966,304 A | 10/1999 | Cook et al. |
| 5,969,967 A | 10/1999 | Aahlad et al. |
| 5,974,497 A | 10/1999 | Teshome |
| 5,975,737 A | 11/1999 | Crater et al. |
| 5,978,578 A | 11/1999 | Azarya et al. |
| 5,978,933 A | 11/1999 | Wyld et al. |
| 5,980,090 A | 11/1999 | Royal, Jr. et al. |
| 5,982,362 A | 11/1999 | Crater et al. |
| 5,982,762 A * | 11/1999 | Anzai et al. ................. 370/338 |
| 5,988,852 A | 11/1999 | Nakanishi |
| 6,002,104 A | 12/1999 | Hsu |
| 6,008,985 A | 12/1999 | Lake et al. |
| 6,026,336 A | 2/2000 | Sakurai et al. |
| 6,033,257 A | 3/2000 | Lake et al. |
| 6,038,486 A | 3/2000 | Saitoh et al. |
| 6,049,578 A | 4/2000 | Senechal et al. |
| 6,052,629 A | 4/2000 | Leatherman et al. |
| 6,061,603 A | 5/2000 | Papadopoulos et al. |
| 6,070,186 A | 5/2000 | Nishio et al. |
| 6,070,250 A | 5/2000 | Yeager et al. |
| 6,076,124 A | 6/2000 | Korowitz et al. |
| 6,078,848 A * | 6/2000 | Bernstein et al. ........... 700/237 |
| 6,085,120 A | 7/2000 | Schwerdtfeger et al. |
| 6,095,674 A | 8/2000 | Verissimo et al. |
| 6,104,875 A | 8/2000 | Gallagher et al. |
| 6,108,662 A | 8/2000 | Hoskins et al. |
| 6,129,449 A | 10/2000 | McCain et al. |
| 6,131,067 A * | 10/2000 | Gererd et al. ............... 701/213 |
| 6,139,177 A | 10/2000 | Venkatraman et al. |
| 6,151,625 A | 11/2000 | Swales et al. |
| 6,167,253 A * | 12/2000 | Farris et al. .............. 455/412.2 |
| 6,170,007 B1 | 1/2001 | Venkatraman et al. |
| 6,173,414 B1 | 1/2001 | Zumkehr et al. |
| 6,183,289 B1 | 2/2001 | Lake et al. |
| 6,195,694 B1 | 2/2001 | Chen et al. |
| 6,195,774 B1 | 2/2001 | Jacobson |
| 6,201,996 B1 | 3/2001 | Crater et al. |
| 6,212,440 B1 | 4/2001 | Suzuki |
| 6,212,608 B1 | 4/2001 | Bak |
| 6,216,158 B1 | 4/2001 | Luo et al. |
| 6,219,708 B1 * | 4/2001 | Martenson .................. 709/226 |
| 6,260,187 B1 | 7/2001 | Clrne |
| 6,266,724 B1 | 7/2001 | Harari et al. |
| 6,269,473 B1 | 7/2001 | Freed et al. |
| 6,272,529 B1 | 8/2001 | Lum |
| 6,272,556 B1 | 8/2001 | Gish |
| 6,282,454 B1 | 8/2001 | Papadopoulos et al. |
| 6,311,101 B1 | 10/2001 | Kastner |
| 6,314,464 B1 | 11/2001 | Murata et al. |
| 6,327,511 B1 | 12/2001 | Naismith et al. |
| 6,345,382 B1 | 2/2002 | Hughes |
| 6,353,860 B1 | 3/2002 | Hare et al. |
| 6,405,099 B1 | 6/2002 | Nagai et al. .................. 700/159 |
| 6,424,883 B1 | 7/2002 | Hosokawa et al. |
| 6,430,564 B1 | 8/2002 | Judge et al. |
| 6,480,903 B1 * | 11/2002 | Voutaz et al. ............... 719/328 |
| 6,499,048 B1 | 12/2002 | Williams |
| 6,574,515 B1 | 6/2003 | Kirkpatrick et al. |
| 6,594,692 B1 * | 7/2003 | Reisman ..................... 709/219 |
| 6,612,022 B1 | 9/2003 | Gale et al. |
| 6,640,308 B1 | 10/2003 | Keyghobad et al. |
| 6,675,193 B1 | 1/2004 | Slavin et al. |
| 6,718,533 B1 | 4/2004 | Schneider et al. |
| 6,760,687 B2 | 7/2004 | Apel et al. |
| 6,788,980 B1 | 9/2004 | Johnson |
| 6,792,321 B2 | 9/2004 | Sepe, Jr. |
| 6,799,148 B2 | 9/2004 | Ling et al. |
| 6,806,847 B2 | 10/2004 | Nixon et al. |
| 6,850,973 B1 | 2/2005 | Larson et al. |
| 6,853,867 B1 | 2/2005 | Klindt et al. |
| 7,020,532 B2 | 3/2006 | Johnson et al. |
| 7,089,530 B1 | 8/2006 | Dardinski et al. |
| 7,146,231 B2 | 12/2006 | Schleiss et al. |
| 7,151,966 B1 | 12/2006 | Baier et al. |
| 7,158,513 B2 * | 1/2007 | Wada et al. .................. 370/389 |
| 7,177,052 B2 | 2/2007 | Lapstun et al. |
| 7,199,784 B2 | 4/2007 | Mathiowetz et al. |
| 7,245,271 B2 | 7/2007 | Nixon et al. |
| 7,272,815 B1 | 9/2007 | Eldridge et al. |
| 7,275,062 B2 | 9/2007 | Deitz et al. |
| 2001/0025307 A1 | 9/2001 | Venkatraman et al. |
| 2001/0034777 A1 | 10/2001 | Venkatraman et al. |
| 2001/0034778 A1 | 10/2001 | Venkatraman et al. |
| 2001/0034779 A1 | 10/2001 | Venkatraman et al. |
| 2001/0034780 A1 | 10/2001 | Venkatraman et al. |
| 2001/0034781 A1 | 10/2001 | Venkatraman et al. |
| 2001/0044836 A1 | 11/2001 | Venkatraman et al. |
| 2002/0067370 A1 | 6/2002 | Forney et al. |
| 2002/0133636 A1 | 9/2002 | Venkatraman et al. |
| 2003/0208558 A1 | 11/2003 | Venkatraman et al. |
| 2004/0103165 A1 | 5/2004 | Nixon et al. |
| 2007/0019560 A1 | 1/2007 | Brewer et al. |

FOREIGN PATENT DOCUMENTS

| | | |
|---|---|---|
| WO | WO 96/31047 | 3/1996 |
| WO | WO 97/07486 | 2/1997 |
| WO | WO 97/26587 | 7/1997 |
| WO | WO 98/29804 | 7/1998 |
| WO | WO98/29804 | 9/1998 |

OTHER PUBLICATIONS

U.S. Appl. No. 09/721,409, filed Nov. 21, 2000, Venkatraman et al.

"Niagara Framework", http://www.tridium.com/products/niagara.asp, Feb. 10, 2005, 2 pages.

Control Shell Version 6.0 User's Manual, 426 pgs., Jan. 1999.

Invensys, "FoxDraw Display Builder and Configurator", 8 pgs., 2004.

Taylor, "Object Oriented Information Systems", 368 pgs., Apr. 10, 1992.

The Foxboro Company, "FoxCMS Change Management System Software," 48 pgs., Aug. 14, 1996.

Foxboro, "I/A Series Software FoxDraw", 8 pgs., 1996.

Foxboro, "Intelligent Automation Series Human Interface Software", 20 pgs., 1997.
Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).
Martin, "Design and Strategy For Distributed Data Processing", Chptrs. 19 & 20, pp. 272-305 (1981).
Tweney, "Java on Your Mobile Phone?", http://www.business2.com (Mar. 14, 2002).
Kostas, et al., "Real-Time Voice Over Packet-Switched Networks", pp. 18-27, IEEE Network (Jan./Feb. 1988).
Andrews, "15 MB in a Matchbook" (Jan. 1995)http://www.byte.com/art/9501/sec4/art5.htm.
Johnsson, et al., "High-Level Grafcet and Batch Control", Nov. 1994, Symposium ADPM.
Mori, et al., "The PCMCIA Developer's Guide, Second Edition," Sycard Technology 1994.
ANSI/ASME PTC 19.1-1985, "Part 1—Measurement Uncertainty", Apr. 30, 1986, entire document.
Kline, "The Purposes of Uncertainty Analysis", vol. 107, Journal of Fluids Engineering, pp. 153-160 (Jun. 1985).
Henry, "A New Approach to Sensor Validation", IMC, Mar. 17, 1992.
Henry, et al., "The Implication of Digital Communications on Sensor Validation," University of Oxford, Report No. OUEL 1912/92.
Henry, "Signal Processing, Data Handling and Communications: The Case for Measurement Validation," University of Oxford, Report No. OUEL 1912/92.
Henry, "Intelligent Behaviour For Self-Validating Sensors", University of Oxford, Report No. OUEL 1912/92.
Henry, et al., "A Standard Interface For Self-Validating Sensors", University of Oxford, Report No. OUEL 1884/91.
Hashemian, et al., "In-Situ Response Time Testing of Thermocouples", ISA 1989, Paper #89-0056, pp. 587-593.
Henry, "A Fault-Tolerant Interface for Self-Validating Sensors", Oxford University, Digest No. 1990/145 (Nov. 1990).
Miyoshi et al., "A Real-Time Java Server for Real-Time Mach", 1997, IEEE., pp. 319-325.
Gaines, B.R. et al. "Mediator: an Intelligent Information System Supporting the Virtual Manufacturing Enterprise," IEEE © 1995 (XP 000586326) pp. 964-969.
Goldammer, G. "HTML-script calls Java-applet . . . a new development technique under a software- and applications-technology configuration," IM Information Management vol. 11, No. 3 (Aug. 2, 1996) pp. 6-14, IDG Communications Verlag, Germany (abstract).
"Agenda," ISA/SP50—1988-180, ISA Draft.
Application of PRIAM Model to Safety Systems on Offshore Oil/Gas Platforms. Silvertech Ltd., Jan. 9, 1995.
"Automation System Monitors, Controls Fab HVAC, Other Systems," Microcontamination (Aug. 1994).
"Background Info on Mercury Project."
Batch Control. Part I: Models and Terminology. (Approved Feb. 28, 1995) ISA-S88.01 1995.
Benkhallat, Yazid, et al. "Interoperability of sensors and distributed systems," Sensors and Actuators A vol. 37-38 (1993), 247-254.
Blevins, Terry. "Characteristics of Function Block Requirements for the Process Industry and Manufacturing Automation," Fisher-Rosemount, Oct. 31, 1995.
Brunn, P. "Collision Avoidance for Two Robots Sharing a Common Workspace," (1995) The Institution of Electrical Engineers.
Burton, P. I. "A personal history of batch control," Measurement + Control vol. 27 (Apr. 1994), pp. 69-73.
Burton, P. I., et al. "Field Bus Based on MIL-STD-1553B: Proposal to ISA-SP-50" ERA Technology Ltd. (Apr. 6, 1988) ISA/SP50-1988-148.
Capetta, L., et al. "From Current Actuators and Transmitters Towards Intelligent Actuation and Measurement: PRIAM Approach," BIAS 93.
Caro, Richard H. "Field Bus Applications," ISA (1989) Paper #89-0569, pp. 989-994.
Caro, Richard H. "The Fifth Generation Process Control Architecture," ISA (1988) Paper #88-1487, pp. 659-667.
Caro, Richard H. "The Fifth Generation Process Control Architecture," ISA Transactions vol. 28 No. 4 (1989), pp. 23-28.
Chettle, Tim. "Multiplexing techniques optimise data collection," Electrotechnology (Oct./Nov. 1995).
Coleman, Vernon. "National Electrical Manufacturers Association Field Bus Report to ISA SP50," (Oct. 1988) ISA/SP50-1988-234.
Conference Record of the 1993 IEEE Industry Applications Conference, Part III (excerpt).
Contents, Proceedings of the Second International Workshop on Configurable Distributed Systems, Mar. 21-23, 1994, Pittsburgh, PA.
Control Technology Corp. News Releases, pp. 1-26.
Craig, Lynn W. "SP-88 Defines Batch Control," Intech Mar. 1994, pp. 34-37.
Crowder, R. S. "A Communication Architecture for Automation & Control," ISA, pp. 669-673.
Crowder, R. S.. "Generic Data Link Transactions for Simple Devices," Proposal to ISA SP50 & IEC/SC65C/WG6 (Oct. 15, 1988) ISA Document.
Crowley-Milling, et al, eds. "Proceedings," 1995 International Conference on Accelerator and Large Experimental Physics Control Systems, Chicago, IL Oct. 30-Nov. 3, 1995, [cover pages].
Delahostria. Communication Model Application Layer. (Oct. 14, 1988) ISA/SP50-1988 247, ISA Draft.
Delfino, B. and Pinceti, P. "Fieldbus Applications for Electrical Industrial Systems," IEEE (1993), pp. 2084-2090.
Dezso, Danyi. "Halozati szabalyozas," Meres es Automatika vol. 37 (1989), pp. 208-213.
Dryden, Patrick. "Tribes webmanage enables remote fixes," Computerworld (May 22, 1995), p. 14.
Editing Committee Draft Application Layer, Version 6, Dec. 1990.
Editing Committee Draft Application Layer, Version 8, May 1991.
Editing Committee Draft Application Layer, Version 12, Oct. 1991.
Esprit Project 6188, "PRIAM Dictionary: Major Terms and Definitions Used in the PRIAM Project," Prenormative Requirements for Intelligent Actuation and Measurement, May 1995.
Esprit Project 8244, "User Requirements for Intelligent Transmitters and Actuators," European Intelligent Actuation and Measurement User Group, Nov. 24, 1995.
Fieldbus Standard for Use in Industrial Control Systems. Part 2: Physical Layer Specification and Service Definition. (1992) ANSI/ISA-S50.02.
Foxboro Fieldbus Proposal (Presented to ISA SP-50 Committee Feb. 24, 1988) ISA/SP50-1988-123B, ISA Draft.
Furness, Harry. "Fieldbus: The Differences Start From the Bottom Up," Control Engineering (Mar. 1994), pp. 75-77.
Greene, Tim. "Sahara puts Java to Management Test," Network World vol. 13, No. 7 (Feb. 12, 1996).
Holding, David and Wood, Graham. "Communications in microprocessor industrial implementation," Microprocessors and Microsystems vol. 3 No. 10 (Dec. 1979), pp. 443-451.
Johnson, Dick. "Pressure Sensing Advances: Are Therein Your Process' Future?" Control Engineering (Apr. 1995), pp. 67-72.
Kelly, D. Mark. "Digital fieldbus cluster cuts plant's wiring costs up to 20%," Intech (Apr. 1995), pp. 62-64.
Ko, Diffu. "Trobe [sic] defines net management role for Web browser software," Network World (May 22, 1995) p. 14.
Koth, H. and Oeder, K. "The Advantages of Intelligent Field Modules for Nuclear Power Plant Operation and Maintenance," Kerntechnik 60 (1996) 5-6, pp. 215-219.
Lenhart, Gerald W. "A Field Bus Approach to Local Control Networks," ISA, Paper #93-281 1993.
Lenhart, Gerald W. "Fieldbus-Based Local Control Networks," Intech (Aug. 1994), p. 31-34.
Loose, Graham. "Fieldbus—the user's perspective," Measurement + Control vol. 27 (Mar. 1994), pp. 47-51.
Meeting Minutes, SP50, International Electrotechnical Commission, Technical Committee No. 65: Industrial-Process Measurement and Control, Sub-Committee 65C: Digital Data Communications for Measurement and Control and Working Group 6: Field Bus Standard for Use in Industrial Control Systems, Feb. 28-Mar. 4, 1988, Scottsdale, AZ.
Meeting Minutes, SP50.4 Application Layer, Oct. 19-21, 1988, Houston, TX.

Meeting Minutes, Windows Working Group of Application Subcommittee, Mar. 1-3, 1989, New Orleans, LA.
Meeting Minutes, Ad Hoc Function Block Meeting, Jun. 14, 1990, Chapel Hill, NC.
Meeting Minutes, SP50, Signal Compatibility of Electrical Instruments, Dec. 5-7, 1990, Orlando, FL.
Meeting Minutes, Process Control Working Group of SP50.4, Jan. 21-23, 1991, Atlanta, GA.
Meeting Notes, International Electrotechnical Commission Sub Committee No. 65C: Digital Communications Working Group 7, Process Control Function Blocks Report to AMT/7. Apr. 4, 1996.
Mirabella, Orazio. "A Short Presentation of IEC Fieldbus Application Layer," Informatics and Communication Institute, Engineering Faculty, University of Catania, Italy.
"Mitsubishi licenses Sun's Java tool," *Electronic Engineering Times* (Dec. 11, 1995) p. 29.
Momal, F., et al. "Using World-Wide-Web for Control Systems," AT Division CERN, 1211 Geneva 23 [no date].
Morel, G., et al. "Discrete Event Automation Engineering: Outline of the PRIAM Project."
"NCR Fieldbus Slave Controller Advance Information," ISA-SP50-1988-161, ISA Draft.
NOAH: Network Oriented Application Harmonisation based on General Purpose Field Communication System. Project description rev. 1.0, Oct. 25, 1995. P-NET, PROFIBUS, WorldFIP.
Nobuhiko, Tsuji, et al. "An Advanced Optical Fieldbus Instrumentation System Using 16×16 Reflection Type Optical Star Coupler and Low Powered Transmitter," pp. 755-764.
"On-line Vending Machine and Catalog Product Icons," *IBM TDB* vol. 38, No. 4 (Apr. 1995) pp. 113-116.
Output to Valve, Revision No. 1.4, Jan. 18, 1991, (Draft Document), Instrument Society of America.
Owen, S., et al. A modular reconfigurable approach to the creation of flexible manufacturing cells for educational purposes, *Fast Reconfiguration of Robotic and Automation Resources* (Colloquium) Oct. 20, 1995, The Institution of Electrical Engineers, Digest No. 95/174.
Pace, Hugh W. "Valve Actuators Ready for Fieldbus," *Control Engineer* (Oct. 1995), pp. 65-73.
Petti, Thomas F. and Dhurjati, Prasad S. "A Coupled Knowledge Based System Using Fuzzy Optimization for Advisory Control," *IChE Journal* vol. 38 (Sep. 1992) No. 9, pp. 1369-1378.
Pfeifer T. and Fussel B. "Sensorbetriebssystem fur messtechnische Problemstellungen in der Produktionstechnik," *Technisches Messen* vol. 58 (1991) Nos. 7/8.
Phinney, Thomas L. "An Analysis of Contending Proposals in ISA SP-50 for an ISA/IEC Field Instrument Bus," ISA (1988) Paper #88-1489.
Preface: Field Bus Process Control User Layer Technical Support, Feb. 10, 1993.
Product Specification, I/A Series® RBATCH II.
PROWAY-LAN Industrial Data Highway. (Approved Feb. 3, 1986) ISA—S72.01-1985.
"Radio Field Bus," ISA/SP50—1988-184, ISA Draft.
Redman, Jun, et al. "Intranet and the internal Web server: A standard user interface for integrating manufacturing applications," Proceedings of the Industrial Computing Conference, vol. 6, No. 1 (1996).
Report from IEC TC65 Working Group 6 Function Blocks, May 1, 1995.
Schuur, C. "Comments on 'Analysis and Suggestions for ISA-SP50' as submitted to the SP50 Committee by Honeywell Inc." (Mar. 11, 1988) ISA-SP50-1988-155, ISA Draft.
Schuur, Chris and Warrior, Jay. "Philips Token Passing Field Bus Controller Timed Token Mode," ISA/SP50—1988-186, ISA Draft.
"SDRD Using 1553B Data Link Services," ISA/SP50-1988-243 (1988).
Skabowski, E. L. "Recommendations for Consideration at October, 1988 Application Layer Subcommittee Meeting," (Oct. 3, 1986).
Smith, Chris. "Tektronix Pushes Ease-of-Use and Low Cost of Operation With Its New Phaser® Color Laser Printer," comp.newprod forum (Jan. 11, 1996).
Solvie, Michael J. "Configuration of Distributed Time-Critical Fieldbus Systems," *IEEE* (1994), p. 211.

Strothman, Jim and Ham, John. "Alliances, Fieldbus, Windows Stir ISA/94 Anaheim Pot," *Intech* (Dec. 1994), pp. 32-35.
Strothman, Jim and Ham, John. "ISA/95 New Orleans: 'Open', NT winds (not Opal) blow strong," *Intech* (Nov. 1995), pp. 45-48.
"Suggested Outline for Application Sub-committee Document: Fieldbus Architecture Subcommittee Document," ISA/SP50—1988-175, ISA Draft.
Table of Contents, Automation & Technology Department, 1995.
Table of Contents, Automation & Technology Department, 1993.
Table of Contents, Industrial Computing Society (no date).
Table of Contents, Proceedings of the Industrial Computing Conference, vol. 3, Sep. 19-24, 1993, Chicago, IL. Industrial Computing Society.
[Table of Contents], Proceedings of the 20th International Conference on Industrial Electronics Control and Instrumentation, vols. 1-3, Sep. 5-9, 1994, Bologna, Italy.
[Table of Content] Proceedings of the 7th Mediterranean Electrotechnical Conference, vol. 1, Apr. 12-14, 1994, Antalya, Turkey.
Table of Contents, ISA/88, Houston, MA, (no date).
Table of Contents, ISA/89, (no date).
Taylor, Ken, et al. "A Telerobot on the World Wide Web," Presented at the 1995 National Conference of the Australian Robot Association, Melbourne, (Jul. 5-7, 1995).
Tobin, David. "Southeast Paper Installs Largest Foxboro Distributed Control System."
"User Layer Structure," SP-50 Technical Report (Jul. 25, 1990).
"User Layer Technical Report," ISA/SP50—1990-389C, ISA Draft.
Weinert, A., et al. "RT/OS—realtime programming and application environment for the COSY control system," *Nuclear Instruments and Methods in Physics Research A* vol. 352 (1994), pp. 277-279.
WG1 List of Criteria (Appendix 1), (Oct. 21, 1988) ISA/SP50-1988-242, ISA Draft.
Wood, G. G. "The Argus Consul System for On-Line Computer Control," *Electrical Engineering Transactions* (Mar. 1969), pp. 114-118.
Wood, G. G. "The Challenge of Standards for Plant Communication," IFAC Distributed Computer Control Systems (1982), pp. 191-192.
Wood, G. G. "Current Fieldbus activities," *computer communications* vol. 11 (Jun. 1988) No. 3, pp. 118-123.
Wood, Graeme G. "Data Transmission, Processing and Presentation," pp. 46-54.
Wood, G. G. "Evolution of communication standards for the process industry," *Measurement + Control* vol. 19 (Jul./Aug. 1986), pp. 183-188.
Wood, Graeme. "Fieldbus Status 1995," *Computing & Control Engineering Journal* (Dec. 1995), pp. 251-253.
Wood, Graeme. "Generic Link Transactions for Simple Devices in Fieldbus." ISA/SP50—1988-240 (Sep. 20. 1988.
Wood, Graeme, G. "Standardisation Work for Communication Among Distributed Industrial Computer Control Systems—A Status Report," INRIA (1984), pp. 67-69.
Wood. G. G. "Survey of LANs and Standards," *Computer Standards & Interfaces* vol. 6 (1987), pp. 27-36.
Wood, G. G. "Towards digital information control," *Measurement + Control* vol. 21 (Jul./Aug. 1988), pp. 179-180.
"Tribe Computer Works' Net Products Can be Managed via World Wide Web," IAC (SM) Newsletter Database™, DataTrends Publications, Inc., No. 11, vol. 7, May 30, 1995.
"Briefs," Network World, May 29, 1995, p. 19.
Wilder, Clinton, "Network Management; Russing Nets Via The Web—Tribe's WebManage uses popular interface," Information Week, May 29, 1995, p. 62.
"Pipeline; Announced," InfoWorld, May 29, 1995, p. 45.
Bernard, Viki, "Remote-access ware emerge; Shiva, Nortel, and Tribe leading list of innovators," PCWeek, No. 21, vol. 12, May 29, 1995, p. 47.
"Tribe Announces Revolutionary Use of the Internet; Launches Innovative Remote Management Solution; New WebManage Technology Provides Network Management via World Wide Web," Business Wire, May 22, 1995.

"Tribe Launches First Networking Device Capable of Being Managed via Internet Web Browser; TribeLink2 Enables Remote Computing and Internet Access," Business Wire, May 22, 1995.
Dryden, Patrick, "Tribes WebManage Enables Remote Fixes," ComputerWorld, May 22, 1995, p. 14.
Ko, Diffu, "Trobe defines net management role for Web browser software," Network World, May 22, 1995, p. 14.
"Tour an actual TribeLink via WebManage," web page print-out from http://www.tribe.com/products/webmanage/quick_view.htm. (1 page).
"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).
"TribeRoute," web page print-out (Jul. 12, 1999) from http://www.tribe.com/products/tr/index. (3 pages).
"TribeStar," web page print-out from http://www.tribe.com/products/tribestar/index.htm (3 pages).
Pappalardo, Denise, "Router Can Be Managed via Net," InternetWeek, May 22, 1995, p. 6.
Rodriguez, Karen, "Tribe sets software," Interactive Age, vol. 2, No. 15, May 22, 1995, p. 25.
Welch, Nathalie, "Tribe to manage via Web; Tribe Computer Works Inc.'s TribeLink2 Product Announcement," MacWEEK, vol. 9, No. 21, May 22, 1995, p. 18.
Pappalardo, Denise, "Digi Introduces IP/IPX Router," InternetWeek, Apr. 24, 1995, p. 15.
"WWWF'94: Papers Received," web page print-out (Apr. 7, 2000) from http://www.ncsa.uiuc.edu/SDG/IT94/Agenda/Papers-received.html (8 pages).
Elmer-Dewitt, Philip, "Snowballs in Cyberspace; With a modem and a soldering iron, you too can build an Internet site that is really cool and totally useless," Time, Jan. 16, 1995, p. 57.
Scharf, Ronald, et al, "Using Mosaic for Remote Test System Control Supports Distributed Engineering," Institute of Computer-Aided Circuit Design—Test and Testsystems Division, University of Erlangen-Nurnberg, Germany, web page print-out from http://www.ncsa.uiuc.edu/SDG/IT94/Proceedings/CSCW/scharf/scharf.html (8 pages).
Cox, Mark J. and Baruch, Dr. John E. F. "Robotic Telescopes: An Interactive Exhibit on the World-Wide Web," web page print-out from http://www.ncsa.uiuc.edu/SDG/IT94/Proceedings/Museum/cox/markcox.html (11 pages).
Gleick, James. "Fast Forward; Really Remote Control," The New York Times, Section 6, col. 3, p. 42, Dec. 3, 1995.
Silverman, Dwight. "'Attaboy' for the best software and hardware of 1994," The Houston Chronicle, Dec. 25, 1994, p. 2.
Browne, Malcolme W. "South Pole Ready for Internet Revolution," The New York Times, Section C, col. 1, p. 1, Jan. 10, 1995.
Wolfe, Alexander, "Strong Brew," Electronic Engineering Times, Apr. 8, 1996, p. 73.
"Special Topic: PC-Based Control," A Supplement to Software Strategies, pp. 3-5, 7-8, 10-15, 20-21.
Momal, F. and Pinto-Pereira, C. "Using World-Wide-Web for Control Systems," from Proceedings 1995 International Conference on Accelerator and Large Experimental Physics Control Systems, Chicago, IL, Oct. 30-Nov. 3, 1995.
"The 'Only' Coke Machine on the Internet," web page print-out (Feb. 12, 1999) from http://www.cs.cmu.edu/~coke/history_long.txt (3 pages).
"CMU SCS Coke Machine: Current Status," web page print-out (Feb. 12, 1999) from http://www.cs.edu/~coke/ (1 page).
"The Switzerland Coke Machine Credits," web page print-out (Feb. 12, 1999) from http://www-swiss.ai.mit.edu/htbin/coke/ (1 page).
"Peter Beebee's Home Page," web page print-out (Feb. 12, 1999) from http://www-swiss.ai.mit.edu/htbin/ptbbgate/jwz/?fetch+personal%2Fmain.text.html (2 pages).
"Bsy's List of Internet Accessible Coke Machines," web page print-out (Feb. 12, 1999) from http://www-cse.ucsd.edu/users/bsy/coke.html (1 page).
"Disk Drive with Embedded Hyper-Text Markup Language Server," IBM TDB, vol. 38, n. 12, Dec. 1995, pp. 479-480.
Leon, Mark, "Tektronix to add Web software on new printers," InfoWorld, Dec. 4, 1995, p. 6.

"I/A Series Model 51 FoxRemote II Installation and Configuration Guide," Apr. 8, 1998 (Preliminary), pp. i-iv, 1-2.
"New State-Logic Microcontroller," News Release, Control Technology Corp., Jun. 1, 1996, (DialogWeb search result).
"New at IPC/92! Ethernet link provides Global PLC Registers," News Release, Control Technology (US), Nov. 20, 1992, (DialogWeb search result).
"New at IPC/92! High-Capacity Integrated Motion Controller," News Release, Control Technology (US) Nov. 20, 1992, (DialogWeb search result).
"Dual-Axis Servo Module for Small Controller," News Release, Control Technology (US), Sep. 11, 1990, (DialogWeb search result).
"Innovative Small Controller Family offers Full Integration," News Release, Control Technology, Aug. 17, 1989, (DialogWeb search result).
AC I/O Modules Available for Low-Cost Automation Controller, News Release, Control Technology Corporation, Jun. 28, 1989 (DialogWeb search result).
"New Small Automation Controller features Precision Analog I/O Modules," News Release, Control Technology (US), May 30, 1989, (DialogWeb search result).
"Inexpensive Automation Controller features Message Display Capability," News Release, Control Technology (US), May 19, 1989, (DialogWeb search result).
"Small Multi-Tasking Controller for Cost-sensitive Applications," News Release, Control Technology US, Nov. 8, 1988, (DialogWeb search result).
"CAD/CAM Software creates Automation 'Programming Environment'," News Release, Control Technology (US), Oct. 3, 1988, (DialogWeb search result).
"Automation Programming Environment runs On IBM (R) -PC," News Release, Control Technology (US), Mar. 29, 1988, (DialogWeb search result).
"Low-Cost Automation Controller features Motion Control, Communications," News Release, Control Technology (US), Mar. 7, 1988, (DialogWeb search result).
"System Provides Stepping Motor Control in Workcell Environment," News Release, Control Technology Corp., Dec. 5, 1986, (DialogWeb search result).
"Multi-Tasking Controller provides High-level Instructions for Motion Control, Sequencing," News Release, Control Technology Corporation, Aug. 22, 1986, (DialogWeb search result).
"Operator's Console creates 'Friendly' Machines," News Release, Control Technology (US), May 19, 1986, (DialogWeb search result).
"Automation Controller features fast 80186 Processor, Integrated Software," News Release, Control Technology (US), Apr. 22, 1986, (DialogWeb search result).
"Plug-Compatible Controls and Actuators Speed System Development," News Release, Control Technology (US), Jan. 13, 1986, (DialogWeb search result).
"Modular Valve Assemblies Connect to Controller with Ribbon Cable," New Product Release, Control Technology (US), Jan. 8, 1986, (DialogWeb search result).
"Linear Actuators offer Plug-Compatibility with Controller," News Release, Control Technology (US), Nov. 21, 1985, (DialogWeb search result).
"Compact System combines Motion Control, Machine Control," News Release, Control Technology, May 28, 1985, (DialogWeb search result).
"Automation Controller accepts Customization," News Release, Control Technology, Jul. 12, 1985, (DialogWeb search result).
"SECS-11 Communication Board Plugs into Automation Controller," News Release, Control Technology, Aug. 26, 1985, (DialogWeb search result).
"Operator's Console for Automated Machines," News Release, Control Technology, Aug. 15, 1985, (DialogWeb search result).
"Programmable Controller offers control of Stepping and Servo Motors," News Release, Control Technology, May 31, 1985, (DialogWeb search result).
Taylor, Ken and Trevelyan, James, "A Telerobot on the World Wide Web," printed from http://telerobot.mech.uwa.edu.au/ROBOT/telerobo.htm (14 pages).

"On-Line Vending Machine and Catalog Product Icons," IBM TDB, v. 38, n. 4 (Apr. 1995), pp. 113-116.

Tinham, Brian, "Getting SCADA by web browsner? Supervisory Control and Data Acquisition," Control and Instrumentation, No. 12, vol. 28, Dec. 1996, p. 5.

"Wizards wheel over SCADA systems; Supervisory Control and Data Acquisition," Control and Instrumentation, No. 12, vol. 28, Dec. 1996, p. 23.

Fulcher, Jim and Dilger, Karen Abramic, "Soft control, Internet spark ISA/96," Manufacturing Systems, vol. 14, No. 12, Dec. 1996, pp. 40-46.

"Information technology in manufacturing," Manufacturing Systems, vol. 14, No. 12, Dec. 1996, pp. 54-78.

"A sensation in supervisory control," Manufacturing Systems (Windows NT in manufacturing Supplement), Oct. 1996, pp. 12A-24A.

Demetratekes, Pam. "Go with the info flow; state-of-the-art automation in the food industry; includes related article on computer software for food processors," Food Processing, vol. 57, No. 7, Jul. 1996, p. 47.

"New Products Provide Interactive Graphics Over Web Using Netscape Plug-Ins and Java," PR Newswire, May 20, 1996.

"Integrated Systems; Industry's top embedded operating software supports Java," M2 Presswire, Mar. 4, 1996.

"ErgoTech upgrades ErgoCim; First 'plug and play' component software for manufacturing," Business Wire, Feb. 15, 1996.

"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.

"Industry's top embedded operating software supports Java; pSOSystem enables Embedded Internet applications and Low-cost Internet appliances," Business Wire, Feb. 1, 1996.

"Gensym introduces G2 WebMiner for accessing and reasoning about data from the World Wide Web," Business Wire, May 15, 1996.

"Gensym introduces Internet connectivity for its G2 family of intelligent real-time software," Business Wire, Mar. 18, 1996.

"Gensym Announces Its Initiative for Leveraging Intelligent Systems with Internet/Intranet Technology," Business Wire, Oct. 7, 1997.

"At Interop, Will ToasterNet Be on the Hot List?" Data Communications, vol. 19, No. 13, Oct. 1990, p. 214.

Zeff, Joe. "Maui Sunset in Real Time (Modems not Optional)," The New York Times, Nov. 27, 1995, Section D, col. 2, p. 5.

Toner, Mike. "Web's view of world far and wide," The Houston Chronicle, Nov. 5, 1995, p. 6.

"Internet windows to the world," New Media Age, Oct. 26, 1995, p. 4.

Foster, Kirsten. "surf's up; lights, camera, but no action; Steve is a Tech-Nomad. He wanders the streets with a camera on his head. And he wants you to join him," The Independent (London), Aug. 13, 1995, p. 10.

Henry, Jim, Ph.D., P.E. "Implementation of Practical Control Systems: Problems and Solutions," web page print-out from http://chem.engr.utc.edu/Documents/MACSCITECH/MACSCITECHpaper1.html (22 pages).

"Jim Henry's 1996 ASEE Paper," web page print-out from http://chem.engr.utc.edu/Documents/ASEE-96-full.html (5 pages).

Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem.engr.utc.edu/Documents/ASEE-95-full.html (22 pages).

"Breaking News for Invensys Software Systems Employees; iBaan and FactorySuite 2000 Integration Announced," internal e-mail dated Mar. 23, 2001.

Gertz, Matthew, et al. "A Human-Machine Interface for Distributed Virtual Laboratories," IEEE Robotics & Automation Magazine 1 Dec. 1994, No. 4 (New York) pp. 5-13.

Soreide, N. N., et al. "Mosaic access to real-time data from the TOGA-TAO array of moored buoys," Computer Networks and ISDN Systems 28 (1995), pp. 189-197.

Goldstein, Ira and Hardin, Joseph. "Guest editorial," Computer Networks and ISDN Systems 28 (1995) p. 1.

Slater, A. F. "Controlled by the Web," Computer Networks and ISDN Systems 27 (1994) pp. 289-295.

Goldberg, Ken, et al. "Beyond the Web: manipulating the real world," Computer Networks and ISDN Systems 28 (1995) pp. 209-219.

Goldstein, Ira and Hardin, Joseph. "Guest editorial," Computer Networks and ISDN Systems 28 (1995) p. 1.

Goldberg, Ken, et al. "Desktop Teleoperation via the World Wide Web," IEEE International Conference on Robotics and Automation, pp. 654-659.

"Disk Drive with Embedded Hyper-Text Markup Language Server," IBM TDB, Dec. 1995.

Stevens, et al. "TCP/IP Illustrated, vol. 1. The Protocols," *TCP/IP Illustrated* vol. 1, XP-002106390, pp. 85-96.

*ICCard Design* Sep./Oct. 1995.

Strack, Bob. "The Hawk is Soaring," *Chemical Processing* (May 1996) p. 11.

"Control System Features Plug-and-Play Technology, Scalability," *Chemical Processing* (May 1996), p. 33.

"Editors' Product Picks," *Chemical Processing* (May 1996), p. 34.

\* cited by examiner

METHODS AND APPARATUS FOR REMOTE PROCESS CONTROL

This is a continuation of Ser. No. 09/379,074, filed Aug. 23, 1999, entitled METHODS AND APPARATUS FOR REMOTE PROCESS CONTROL, which is a continuation of Ser. No. 08/700,199, filed Aug. 20, 1996, entitled METHODS AND APPARATUS FOR REMOTE PROCESS CONTROL (the teachings both of which are incorporated herein by reference). The invention pertains to process control and has application to remote process control.

BACKGROUND OF THE INVENTION

Process control refers to the control of the operational parameters of a system by monitoring one or more of its characteristics over time. It is used to insure that the quality and efficiency of the system remain within desired parameters over the course of time. While process control is typically employed in the manufacturing sector for process, repetitive and discrete manufactures, it also has wide application in service industries, such as environmental control.

Process control equipment typically utilizes control/sensing devices that are physically integrated into the systems being controlled. For example, a thermostat is typically used in environmental control to insure that building temperatures remain within specified parameters. Likewise, flow control sensors and automated valves are typically used in process manufacturing to insure proper fluid flow volumes.

Though in early process control systems, control/sensing devices were typically stand-alone units, modern process control systems provide central workstations for monitoring and controlling the control/sensing devices. Particularly robust systems are the I/A Series™ industrial automation systems designed, manufactured and marketed by the assignee hereof, The Foxboro Company, of Foxboro, Mass., USA. In these systems, multiple control/sensing devices are coupled by way of buses to control stations which, in turn, are coupled by way of a local area network (LAN) to one or more operator workstations.

The I/A Series systems are built around the client/server model. Client applications software executing on the workstations exchange information with the control/sensing devices via a server, referred to as the "object manager," executing in distributed fashion in the control stations. Upon request by a client application, the server creates, locates, accesses and updates data structures ("objects") storing information on the status of at least selected control/sensing devices. For example, a client application that displays temperatures sensed by a thermocouple requests that the server create an object storing a temperature reading from the thermocouple and that the server notify the client each time the temperature changes.

Although modern process control systems, such as the I/A Series systems, have proven quite successful, to date they have provided only limited remote access capabilities. Thus, while numerous operator workstations may reside within the factory or facility in which the control/sensing devices are disposed, it has traditionally proven difficult to access and control those devices outside those areas.

Remote access and control of processes is desirable for a number of purposes. A plant manager who is "on the road," for example, may wish to monitor the plant processes while travelling. By way of further example, the manufacturer of process control equipment may require remote access to a plant's control/sensing devices in order to provide technical support.

An object of this invention is to provide improved methods and apparatus for process control.

Another object of the invention is to provide such methods and apparatus as permit monitoring and control of remote processes.

Still another object of the invention is to provide such methods and apparatus as can be readily adapted to existing automated process control systems.

Yet still another object of the invention is to provide such methods and apparatus as can be implemented without undue expense and without undue consumption of resources.

SUMMARY OF THE INVENTION

The aforementioned objects are among those attained by the invention, which provides, in one aspect, a system for process control comprising a server digital data processor and a client digital data processor that are coupled by a network, such as the Internet or an Intranet. The server digital data processor, which is additionally coupled to a control/sensing device and associated interface equipment (collectively, referred to as "process control apparatus"), includes a command processor that transfers information between the network and the process control apparatus.

The client digital data processor includes an information client (e.g., an Internet web browser) capable of requesting and receiving an applet from the server digital data processor. That information client, further, defines a hardware-independent and operating system-independent virtual machine environment within the client digital data processor.

The client digital data processor executes, within that virtual machine environment, an applet that configures the client digital data processor as a "process controller" that establishes communications over the network with the command processor and that monitors and/or controls the process control apparatus via those communications. The applet is intermediate or executable code that is suitable for interpretation or execution within the virtual machine environment and that is hardware-independent, operating system-independent and windows system-independent.

In further related aspects, the aforementioned applet can be, for example, JAVA programming language bytecode, and the virtual machine environment can be that created by a JAVA-enabled web browser.

According to other aspects of the invention, the command processor in a system for process control as defined above provides services (i.e., "software services") for access and modification of information regarding the process control apparatus. These services can permit, for example, the creation of a data structure object that stores information about the process control apparatus and that associates a name with that object; the destruction of such an object; the accessing of information in such an object; the updating of information in such an object; the determination, from an object name, of the physical address of the object; and the notification of changes in information stored by the object. The process controller generates and transmits over the network to the command processor requests for such services in order to monitor and/or control the process control apparatus.

A further aspect of the invention provides a system as described above in which the process controller generates and transfers commands (e.g., requests for service) over the network to the command processor in order to effect a transfer from the command processor of information regarding a status of the process control apparatus. The command processor responds to those requests by generating information on the status of the process control apparatus and transferring it back to the process controller over the network. The process controller can, for example, generate a user display based on that information.

In a related aspect, the command processor responds to selected commands (i.e., requests for event-driving access) by notifying the process controller of changes in the status of at least selected aspects of the process control apparatus. By way of example, where the process control apparatus includes a thermocouple, this aspect of the invention permits notification of the command processor whenever the thermocouple senses a change in temperature that exceeds a predetermined delta value.

Still further aspects of the invention provide process control systems as described above in which the server digital data processor includes an information server (e.g., a hypertext transfer protocol server). An information client (e.g., web browser) in the client digital data processor establishes communications with the information server over the network and receives therefrom a hypertext markup language (HTML) document referencing the applet. The web browser generates a user display of that document and, in response to a user command, transfers to the information server a request for the applet.

Yet still further aspects of the invention provide systems for process control in which a first digital data processor executes a JAVA applet within a virtual machine environment defined on the digital data processor. The applet configures the digital data processor to generate a message to invoke a method in connection with monitoring and/or controlling a process control apparatus. An object manager, which is in communication with the JAVA applet, responds to the message for invoking the method.

Other aspects of the invention provide methods for process control paralleling the operations of the systems described above.

These and other aspects of the invention are evident in the drawings and in the detailed description that follows.

BRIEF DESCRIPTION OF THE DRAWINGS

A further understanding of the invention may be attained by reference to the drawings, in which.

DETAILED DESCRIPTION OF THE ILLUSTRATED EMBODIMENT

Figure 1:
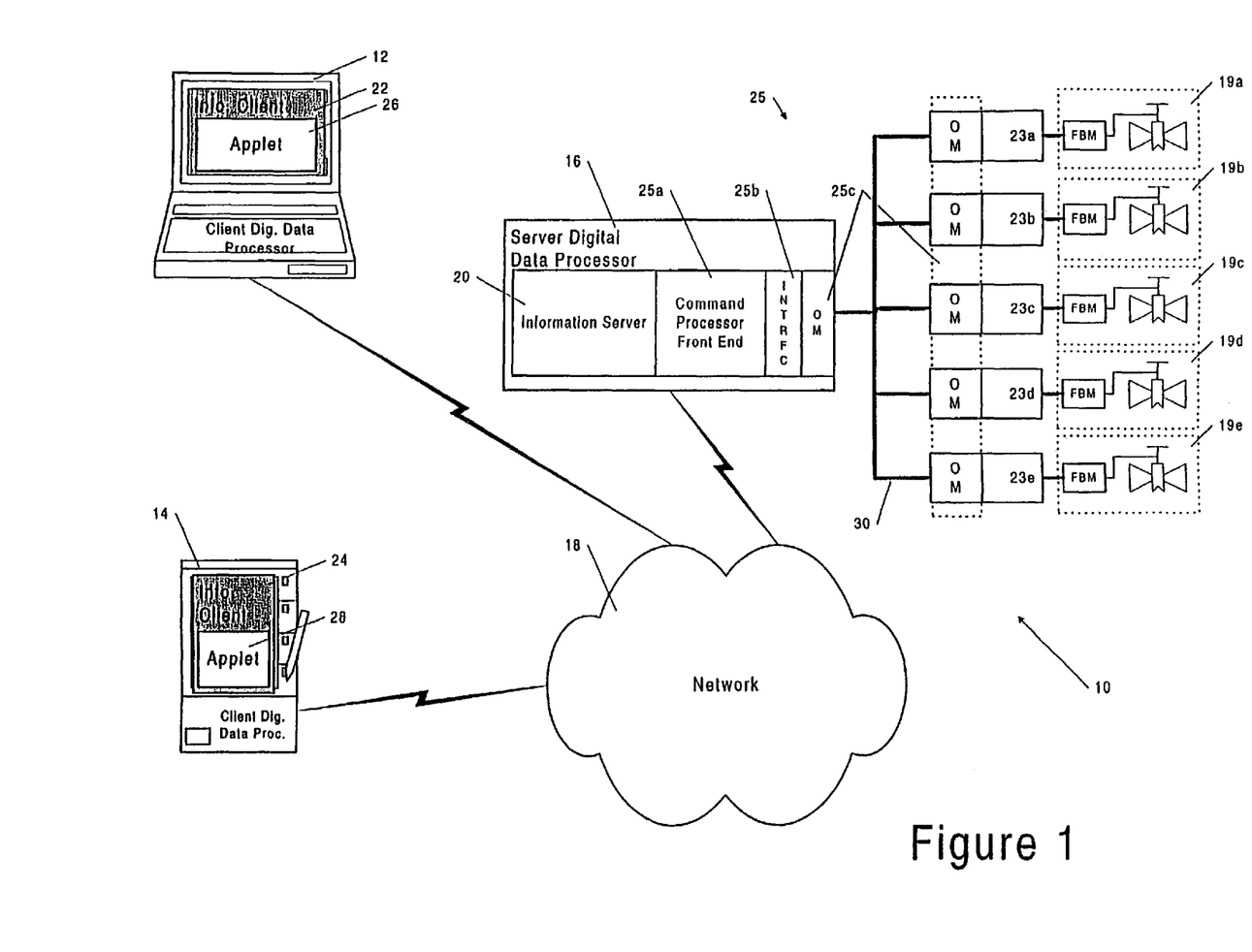
FIG. 1 depicts a system for process control according to the invention.

FIG. 1 depicts a system 10 for process control according to the invention. The system includes client digital data processors 12, 14 and server digital data processor 16. The digital data processors 12, 14, 16 are connected to one another via network 18.

Server digital data processor 16 is, additionally, coupled to process control apparatus 19a-19e via bus-network structure 30 and control stations 23a-23e, as shown. The process control apparatus include conventional control/sensing devices, which are shown in the illustration as flow control valves, and associated interface equipment, which are marked "FBM" in the illustration. The process control apparatus 19a-19e are intended to represent any conventional control/sensing devices and interface equipment of the type conventionally used to monitor and control processes—including, by way of non-limiting example, continuous, repetitive and discrete processes, and environmental control processes, among others.

As discussed below, control stations 23a-23e include objects storing information that control, and reflect the status of, their associated process control apparatus 19a-19e. The control stations 23a-23e also execute object management software (marked "OM") that manage and oversee access to those objects. The control stations 23a-23e are of the type conventionally used in a distributed process control architecture. Preferred such control stations are commercially available from the assignee hereof, The Foxboro Company, as part of its I/A Series industrial automation systems.

The digital data processors 12, 14, 16 comprise conventional digital data processing systems of the type commercially available in the marketplace. Though client digital data processors 12, 14 are illustrated as a portable computer and a personal digital assistant, respectively, those skilled in the art will appreciate that these may comprise other computing systems, such as desktop computers and workstations, as well. The digital data processors 12, 14, 16 may be coupled to the network 18 directly, as shown, or other networks (e.g., LANs and WANs), routers, or interface servers (not shown).

The network 18 comprises any conventional digital data processing network (e.g., LAN or WAN), cable television-based network, wireless network and/or any telecommunications-based network capable of supporting communications between server digital data processor 16 and client digital data processors 12, 14. The network 18 preferably comprises the global Internet and/or an enterprise-based Intranet supporting communications via the TCP/IP protocol (i.e., the current standard protocol of the Internet). Utilization of networks supporting this protocol is advantageous insofar as it permits the use of commercially available products (such as web browsers, discussed below) in components of the illustrated embodiment. Those skilled in the art will appreciate that the invention is applicable to networks supporting other protocols, as well.

The digital data processors 12, 14, 16 execute software that respectively configure them for communication over the network 18. For example, they execute protocol stacks and other software that permit them to establish and carry out communications utilizing the TCP/IP network protocol. In addition, they execute information client/server software that configures them to carry on high-level communications, particularly, over the Internet.

More particularly, in the illustrated embodiment, server digital data processor 16 includes information server 20 responsible for establishing communications over network 18 with information clients executing on the client digital data processors 12, 14.

The information server 20 is preferably a hypertext transfer protocol (HTTP) server capable of transferring markup language information and, particularly, hypertext markup language (HTML) documents, to the client digital data processors 12, 14. In alternative embodiments of the invention, information server 20 can comprise any other such server capable of supplying an applet to the client digital data processors 12, 14 in response to requests by them.

The information server 20 establishes communications with the client digital data processors 12, 14 and, particularly, their respective information clients in the conventional manner known in the art. Once communications are established, the information server transfers to the information client an applet that executes within the virtual machine environment and that monitors and/or controls the process control apparatus via communications with a command processor in the server digital data processor 16, as discussed below.

The client digital data processors 12, 14 include information clients 22, 24, respectively, that are responsible for initiating and conducting at least preliminary communications with the server digital data processor 16 over the network 18. The information clients 22, 24, particularly, (1) initiate communications with the information server 20 over the network, (2) request and receive from the information server 20 an applet, and (3) define a platform-independent (i.e., a hardware-independent, operating system-independent and window system-independent) virtual machine environment within the respective client digital data processor 12, 14. Such information clients are, in one embodiment, JAVA-compliant web browsers including the HotJava browser from Sun MicroSystems, Inc., NetScape Navigator from Netscape Communications Corporation, and the Internet Explorer from Microsoft Corporation.

As used herein, an applet is intermediate or executable code suitable for interpretation or execution within the virtual machine environment and that is hardware-independent, operating system-independent and windows system-independent Preferred applets are in the form of Java bytecode of the type generated by the Java language compiler available from Sun Microsystems, Inc.

The aforementioned preferred web browsers define a preferred virtual machine environment comprising the Java programming language run-time platform and Java interpreter.

Although a preferred information client is a web browser, the invention can be practiced with other information clients capable of (1) initiating communications with the information server 20, (2) requesting and receiving from the information server 20 an applet, and (3) defining a platform-independent (i.e., a hardware-independent, operating system-independent and windows system indepent) virtual machine environment within the respective client digital data processor 12, 14 for execution of such an applet.

In addition to information server 20, server digital data processor 16 includes command processor 25, comprising front end 25a, interface section 25b, and an object manager 25c. Together, these transfer information between the network 18 and process control apparatus 19a-19e. As shown in the illustration, the object manager functionality is distributed among the control stations 23a-23e. Each object manager maintains the data structures—to wit, objects—that control and reflect the status of its associated process control apparatus 19a-19e.

The object manager 25c provides software services for access that permit the creation of named objects; destruction of such objects; accessing and updating of information in the objects; the locating of objects within the distributed process control architecture; and notification of changes in the information stored in objects (i.e., event-driven notification).

As noted, the object manager 25c allows uniquely named objects to be distributed over the control stations 23a-23e in a location-independent way. Using the object manager 25c (via front end 25a), applets 26, 28 may create, read, write, and destroy instances of objects, which are subtyped into four categories: variable—used to contain an instance of any scalar data type (e.g., int, float, etc.) or a string; alias—used to contain a string which refers to the name of another object; device—used to identify a station or device in the system. An instance of a device type object contains no explicit state—the name of the object is itself the state; and process—used to identify an executing process in the system. A process object is identical to a device object in that there is no explicit state.

As indicated above, in order to manipulate instances of objects, the object manager 25c provides life cycle services, access services and connection services. Life cycle services are used to create, name, and destroy shared objects; to register the name of process-control objects; and to find the location of any object. Access Services are used to get and set the value of one or more process-control and/or shared objects. Typically, access services are suitable for situations where a single transfer of data is sufficient.

Connection services are also used to get and set the value of one or more process-control and/or shared objects. However, these services are more suited for situations where multiple transfers of data are expected. In addition, connection services provide the ability for a client to be continuously updated with the value of an object when it exceeds a specified delta.

The object manager 25c relies upon the use of broadcasts over bus structure 30 in order to perform the above services. For example, when an applet 26, 28 makes an access request on an object by name, the object manager 25c will broadcast the access request to all stations 23a-23e, if the object manager 25c does not know the location of object. Each station 23a-23e then determines if it is the one that hosts the requested object. Only the station that hosts the named object responds to the request.

A preferred object manager 25c is that commercially available from the assignee hereof, The Foxboro Company, as part of its I/A Series of industrial automation systems. A software interface, or "API," of that preferred object manager is described in publicly available documentation, including the document entitled "Object Manager Calls," a copy of which is filed as an appendix herewith.

The command processor front end 25a executes on server digital data processor 16, configuring it to respond to requests from applets 26, 28 to establish communications with them over the network 18. Once communications are established, the front end 25a responds to requests received from applets 26, 28 over network 18 to transfer information to and from process control apparatus 19a-19e via the object manager 25c.

Particularly, the front end 25a responds to requests received over the network in TCP/IP protocol to generate calls to object manager 25c in accord with its aforementioned API. Moreover, the front end 25a responds to information generated by the object manager 25c in response to those calls by transmitting that information back over the network 18, in accord with the TCP/IP protocol, to the applets 26, 28. In a preferred embodiment, the front end 25a presents a simplified interface to the object manager 25c, e.g., permitting applets 26, 28 to make requests and receive responses in the form of text strings, as discussed below.

Software implementing a preferred front end 25a as a Java programming language application is filed as appendix hereto. Those skilled in the art will appreciate that alternate embodiments may implement the front end in other programming languages suitable for, or that can be adapted to, provide an interface between the network 18 protocol and the object manager 25c.

Interface section 25b provides a software interface between the front end 25a and the object manager 25c. As noted above, in a preferred embodiment, the front end 25a is implemented as a Java programming language application. The object manager 25c, on the other hand, is implemented as a C programming language application and, accordingly, its API includes pointer-based parameters. The interface section 25b compensates for the inability of the Java front end 25a to utilize pointer-based parameters, e.g., by converting them to arrays as discussed further below.

Software implementing a preferred interface section 25b in the C programming language is filed as appendix hereto. Those skilled in the art will appreciate that interface section 25b is optional and may be excluded in embodiments where the front end 25a can make calls directly to the object manager 25c.

The client digital data processors 12, 14 execute applets 26, 28 within the virtual machine environments defined by the information clients 22, 24. Each applet 26, 28 configures its respective client digital data processors as a process controller that establishes communications over the network 18 with the command processor front end 25a and that monitors and/or controls the process control apparatus 19a-19e via those communications. More particularly, the process controllers generate and transfer requests for service over the network 18 to the command processor 25 so as to effect the transfer of information controlling, and reflecting the status of, the process control apparatus 19a-19e. The process controllers also receive information from the command processor 25, e.g., for display to an operator.

As noted above, the applets 26, 28 comprise intermediate or executable code that is interpreted or executed with in the virtual machine environment defined by the information clients and that is hardware-independent, operating system-independent and windows system-independent. Source code for preferred applets, in the Sun MicroSystems Java programming language, is provided in the appendix filed herewith.

Figure 2:
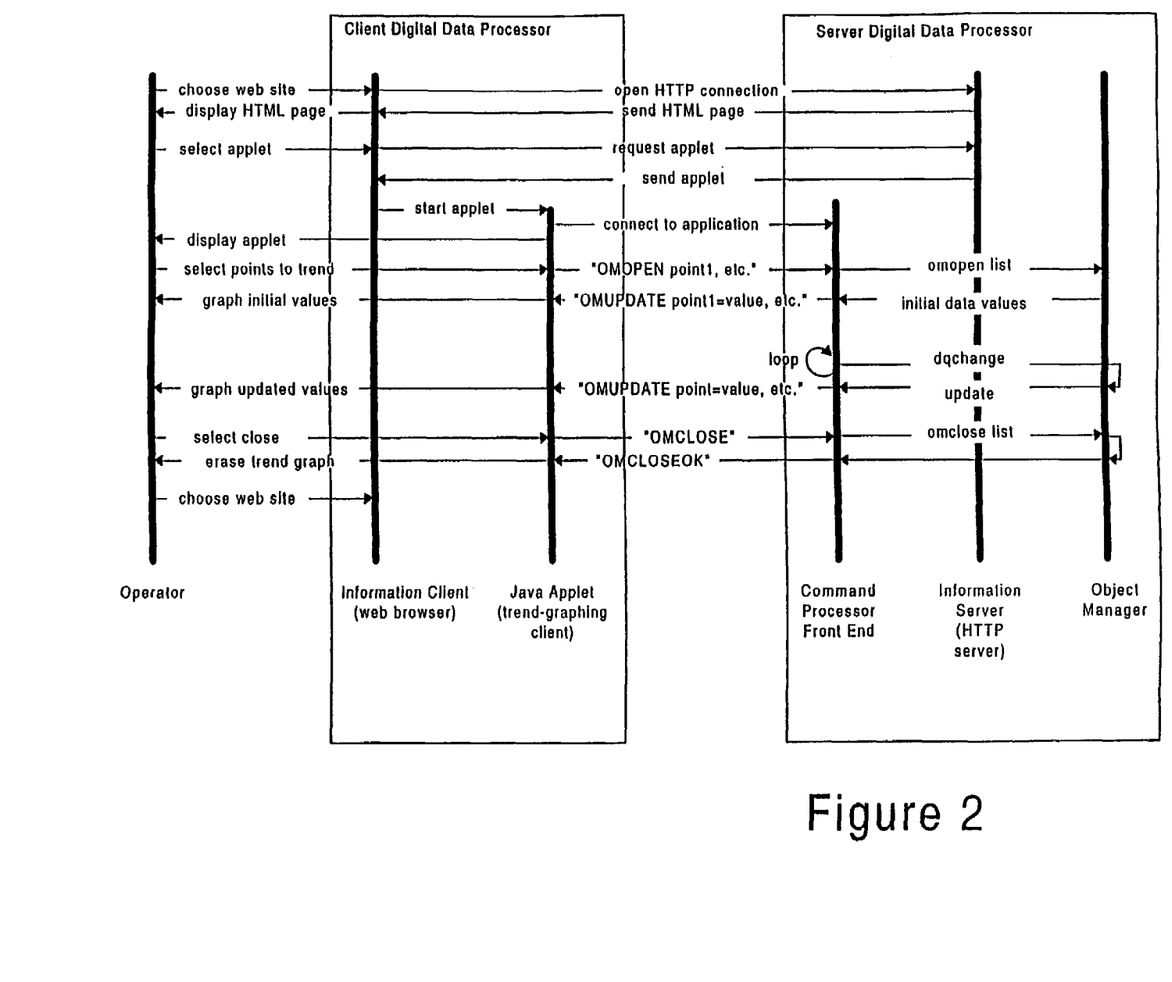
FIG. 2 is an event trace diagram depicting messages that flow among the components of the system of FIG. 1 in an embodiment for graphing tends in process control apparatus data values.

A process control system constructed and operated in accord with system 10 of FIG. 1 can be employed in a wide variety of process control embodiments. One such embodiment is shown in FIG. 2 and described below. That embodiment provides for generation, by an applet executing on the client digital data processor, of graphs showing trends in data values of process control apparatus coupled to a server digital data processor.

FIG. 2 is an event trace diagram depicting messages that flow among the components of the system 10 of FIG. 1 in the above-mentioned embodiment. The components of the system 10 are shown in the event trace diagram as vertical lines with the name of the component at the bottom of the line. Messages are represented by arrows. Each message flows in the direction of the arrow from component to component. Messages that happen earlier in time are toward the top of the diagram.

Referring to FIG. 2, communication begins with the operator signaling the information client 22 to establish communications with the server digital data processor 16 over the network 18. The operator can signal the information client, e.g., a keyboard stroke or "mouse" click on the operator console (not shown). In the illustrated embodiment, the information client 22 is the Netscape web browser.

In response the operator's request, the information client 22 generates and transmits over network 18 a request for connection with information server 20, e.g., an HTTP server, executing on server digital data processor 16. Once the connection is established, the HTTP server 20 sends to the web browser 22 an HTML page that references (i.e., provides an address for) a trend-graphing applet. The HTML page also optionally includes text and graphics describing the applet.

The web browser 22 displays the HTML on the operator console. If the operator signals the web browser 22 that he or she wishes to access the applet, the web browser 22 transmits to the HTTP server 20 over the network 18 a request for the applet. It will be be appreciated that the applet may be transmitted to the web browser 22, along with an initial HTML document.

The HTTP server 20 responds to such a request for forwarding Java bytecode for the applet over the network 18 to the web browser 22. On receipt of the applet, the JAVA-compatible web browser 22 executes the applet 26 in the virtual machine environment defined in the web browser 22.

Once executing, the applet 26 sends a request to establish a separate communications link over the network 18 with the command processor front end 25a, e.g., a Java application executing on the server digital data processor 16. This separate connection is used by the applet 26 and the front end 25a to permit the exchange messages over the network and, particularly, to permit the applet 26 to make requests of the command processor 25 for process control apparatus data to be graphed.

Once communications are established, the applet 26, 28 generates a display on the operator console of the client digital data processor 12 and permits the operator to enter the names of process control apparatus data values (i.e., "points") that are to be graphed On the operator's command, the applet 26 sends a request over the network 18 to the front end 25a specifying the OMOPEN service and listing the names of operator-specified points. The request is in text or ASCII format, e.g., "OMOPEN name1; name2; name3; etc."

On receipt of the OMOPEN request, the front end 25a creates a data structure required by object manager 25c, to wit an OM list, and includes in that data structure the names of the specified points. The front end 25a then makes an "omopen list" call to the object manager 25c utilizing the aforementioned API. A further understanding of the OM list data structure and of the "omopen list" call. as well as the other data structures and calls to the object manager 25c, may be attained by reference to the appendix filed herewith.

The object manager 25c responds to the omopen list call by querying the respective process control apparatus 19a-19e for current data values for the points. The object manager 25c returns those data values to the front end 25a which, in turn, generates and transmits to the applet 26, 28 a text message listing the initial data points. That message includes the keyword OMUPDATE, followed by the names and values of each of the points, e.g., "OMUPDATE point1=value; point2=value; etc." The applet 26, 28 graphs those initial data points on the operator console.

The object manager 25c then begins looping, while awaiting further requests from the client applet 26 and while awaiting updates on the data values from the object manager 25c. When such an update is received, the front end 25a generates and transmits to the applet 26 a further text message in the form "OMUPDATE point1=value; point2=value; etc." listing the updated data values points. The applet 26 graphs those initial data points on the operator console at the end of the graph time interval.

The front end 25a continues looping and forwarding updates until the operator signals the applet 26 to stop trend graphing. In that event, the applet 26 sends a close request over the network to the front end 25a in the form of a text message "OMCLOSE." On receipt of that request, the front end 25a, in turn, makes an omclose list call to the object manager 25c in accord with the aforementioned API. When that call returns, front end 25a sends an "OMCLOSEOK" text message to the applet, 26 causing it to clear the trend graph.

At this point, the operator can either specify new points to the applet 26 or can tell the web browser 22, 24 to connect to a different information server. If the operator signals that he or she wishes to connect to another server, the client applet 26 breaks the connection with the server by sending an "OMBREAK" message to the front end 25*a* over the network. The front end 25*a* than resets, and waits for the next connection.

In a preferred embodiment, the method illustrated in FIG. 2 is implemented in the Java programming language. As those skilled in the art will appreciate and as discussed above, all Java applets and Java applications run inside of a Java Virtual Machine. All implementations of the Java Virtual Machine are guaranteed to be identical regardless of the many hardware platforms on which they run.

The above-described trend-graphing client Java applet preferably runs on the Java Virtual Machine that is implemented by Netscape Navigator version 2.02. The trend client applet 26 is intended to be portable. So it only uses those classes that are present in all implementations of the Java systems. The trend-graphing applet 26 uses Java system classes to manage the screen, and connect to the trend server, and provide timing intervals.

The trend-graphing applet 26 implements classes that conduct all operator interaction. For example, it accept the names of the points to be graphed. It also defines the GUI buttons used by the operator to signal when graphing is to start or stop. Further, the trend-graphing applet 26 plots X-Y axes, graph the points, and parses messages from the front end 25*a*.

The applet 26 also processes the following messages from the server: "OMUPDATE name2=value; name3=value; . . . "; OMCLOSEOK.

The illustrated front end 25 (or "trend-graphing server") is not portable to just any Java Virtual Machine because it must call outside of the Java environment to the object manager 25*c*. To do this, the trend server class is defined to have "native methods". A "native method" is any member function of a class that is implemented in a language other than Java. A native method can enable access to functions and data that are "native" to a particular hardware platform operating system or a running application (like the object manager 25*c*).

Native member function are declared in the class as native. They are implemented in a library that is loaded by the Java environment at runtime. On Solaris this is a libfile.so file. On Windows NT this would be a library.dbl file. The native methods, which constitute the interface 25*b*, are defined to create a new OM list, add a named point to the list, open the list check the list for updates (using dqchange), and close the list. Source code for a preferred implementation of native methods is supplied in the appendix filed herewith.

The command processor front end 25*a* runs in a Solaris implementation of the Java Virtual Machine. The front end 25*a* processes the following messages from the applet 26: "OMOPEN name1; name2; name3; . . . " (in response to which it creates a list with the specified points and opens the list): "OMCLOSE" (in response to which it closes the list); and "OMBREAK" (in response to which reset and wait to accept a new connection).

Described above and illustrated in the drawings are improved methods and apparatus for process control. Those skilled in the art will appreciate that the embodiments discussed above and shown in the claims are merely illustrative and that other embodiments incorporating modifications within the reach of one of ordinary skill in the art fall within the scope of the invention, of which we claim:

The invention claimed is:

1. A process control system comprising
   A. a plurality of devices to any of monitor and control a process,
   B. a portable computer equipped for display to, and input from, an operator,
   C. a program executing on the portable computer that responds to input to transmit to a digital data processor separate from the portable computer a request to update information that controls one or more of the devices,
   D. software executing on the digital data processor, the software responding to selected requests received from the program to issue a command to update information that controls one or more of the devices.

2. The process control system of claim 1, wherein the portable computer and the digital data processor are disposed remotely with respect to one another.

3. The process control system of claim 1, wherein the program executing on the portable computer responds to input from the operator to transmit a request to get information reflecting the status of one or more of the devices.

4. The process control system claim 3, wherein the software executing on the digital data processor responds to selected requests received from the program to issue a command to obtain information reflecting the status of one or more of the devices.

5. The process control system of claim 3, where the program executing on portable computer graphically displays data values associated with any of the plurality of devices.

6. The process control system of claim 3, wherein the program executing on the portable computer displays on the portable computer at least selected gotten information reflecting the status of one or more devices.

7. The process control system of claim 1, adapted to permit the portable computer any or monitor and control one or more plant processes.

8. The process control system of claim 7, adapted to provide the portable computer remote access to one or more of said devices for purposes of any of monitoring and controlling said one or more plant processes.

9. The process control system of claim 7, adapted to facilitate the provision of technical support via the portable computer.

10. The process control system of claim 1, where the program responds to operator input to transmit requests to get a process variable associated with one or more of the devices.

11. The process control system of claim 1, wherein the portable computer is a personal digital assistant.

12. The process control system of claim 1, wherein the portable computer takes input from any of a keyboard or mouse.

13. A process control system of the type having a plurality of devices to any of monitor and control a process, the process control system comprising
   A. a portable computer equipped for display to, and input from, an operator,
   B. a program executing on the portable computer that transmits to a digital data processor requests to update information that controls one or more of the devices, the program responding to operator input to transmit requests to get information reflecting the status of one or more of the devices and/or displaying said information,
   C. software executing on the digital data processor, the software responding to requests received from the program to selectively (a) issue a command to update information that controls one or more of the devices and (b) obtain information pertaining to one or more of the devices,
   D. wherein the digital data processor is disposed remotely from the portable computer and is coupled for communication therewith via a wireless network.

14. The process control system of claim 13, adapted to permit the portable computer to any or monitor and control one or more plant processes.

15. The process control system of claim 14, adapted to permit the portable computer to provide remote access to one or more of said devices for purposes of any of monitoring and controlling said one or more plant processes.

16. The process control system of claim 14, adapted to facilitate the provision of technical support via the portable computer.

17. The process control system of any of claim 13 or 14, wherein the portable computer takes input from any of a keyboard or mouse.

18. The process control system of any of claim 13 or 14, where the program responds to operator input to transmit requests to get a process variable associated with one or more of the devices.

19. The process control system of any of claim 13 or 14, wherein the portable computer is a personal digital assistant.

20. The process control system of any of claim 13 or 14, where the program executing on portable computer graphically displays data values associated with any of the plurality of devices.

21. The process control system of any of claim 13 or 14, wherein the program executing on the portable computer displays on the portable computer at least selected gotten information reflecting the status of one or more devices.

22. A process control system comprising
A. a plurality of devices to any of monitor and control a process,
B. a portable computer equipped for display to, and input from, an operator,
C. a digital data processor coupled to the portable computer via a wireless network,
D. software executing on the digital data processor, the software responding to selected requests received from the portable computer to execute a service for at least one of (i) creating a named object that stores information regarding the one or more control/sensing devices, (ii) destroying such an object, (iii) accessing information in such an object, (iv) updating information in such an object, (v) determining, from an object name, a physical address associated with such an object, and (vi) providing notification of changes in at least selected information stored in such an object, and
E. the portable computer transmitting to the digital data processor requests for one or more said services, and responding to input to transmit to the digital data processor requests for one or more of said services in order to update information in an object that is associated with one or more of the devices.

23. The process control system of claim 22, wherein the portable computer is configured as a process controller.

24. The process control system of claim 22, wherein the portable computer transmits to the digital data processor requests for one or more of said services in order to any of monitor and control one or more of said devices.

25. The process control system of claim 22, wherein the software executing on the digital data processor responds to selected requests received from the portable computer to issue commands to update information in an object that is associated with one or more of the devices.

26. The process control system of claim 22, wherein the portable computer responds to input to transmit requests for one or more said services in order to get information reflecting the status of one or more of the devices.

27. The process control system claim 26, wherein the software executing on the digital data processor responds to selected requests received from the portable computer to issue a command to access information in an object associated with one or more of the devices.

28. The process control system of claim 27, wherein the portable computer displays on the portable computer at least selected gotten information reflecting the status of one or more devices.

29. The process control system of claim 22, where the portable computer graphically displays data values associated with any of the plurality of devices.

30. The process control system of claim 22, adapted to permit the portable computer any or monitor and control one or more plant processes.

31. The process control system of claim 30, adapted to provide the portable computer remote access to one or more of said devices for purposes of any of monitoring and controlling said one or more plant processes.

32. The process control system of claim 30, adapted to facilitate the provision of technical support via the portable computer.

33. The process control system of claim 22, where the portable computer responds to operator input to transmit requests to get a process variable associated with one or more of the devices.

34. The process control system of claim 22, wherein the portable computer is a personal digital assistant.

35. The process control system of claim 22, wherein the portable computer takes input from any of a keyboard or mouse.

36. A process control system comprising
A. a plurality of devices to any of monitor and control a process,
B. a portable computer equipped for display to, and input from, an operator,
C. a digital data processor coupled to the portable computer via a wireless network,
D. software executing on the digital data processor, the software responding to selected requests received from the portable computer to execute a service for at least one of (i) creating a named object that stores information regarding the one or more control/sensing devices, (ii) destroying such an object, (iii) accessing information in such an object, (iv) updating information in such an object, (v) determining, from an object name, a physical address associated with such an object, and (vi) providing notification of changes in at least selected information stored in such an object.

37. The process control system of claim 36, wherein portable computer transmits to a digital data processor a request for one or more said services.

38. The process control system of claim 37, wherein the portable computer is configured as a process controller.

39. The process control system of claim 37, wherein the portable computer transmits to the digital data processor requests for one or more of said services in order to any of monitor and control one or more of said devices.

40. The process control system of claim 37, wherein the portable computer responds to input to transmit to the digital data processor requests for one or more of said services in order to update information in an object that is associated with one or more of the devices.

41. The process control system of claim 40, wherein the software executing on the digital data processor responds to selected requests received from the portable computer to issue commands to update information in an object that is associated with one or more of the devices.

42. The process control system of claim 40, wherein the portable computer responds to input to transmit requests for one or more said services in order to get information reflecting the status of one or more of the devices.

43. The process control system of claim 40, wherein the software executing on the digital data processor responds to selected requests received from the portable computer to issue a command to access information in an object associated with one or more of the devices.

44. The process control system of claim 43, wherein the portable computer displays on the portable computer at least selected gotten information reflecting the status of one or more devices.

45. The process control system of claim 37, where the portable computer graphically displays data values associated with any of the plurality of devices.

46. The process control system of claim 37, adapted to permit the portable computer any or monitor and control one or more plant processes.

47. The process control system of claim 46, adapted to provide the portable computer remote access to one or more of said devices for purposes of any of monitoring and controlling said one or more plant processes.

48. The process control system of claim 46, adapted to facilitate the provision of technical support via the portable computer.

49. The process control system of claim 37, where the portable computer responds to operator input to transmit requests to get a process variable associated with one or more of the devices.

50. The process control system of claim 37, wherein the portable computer is a personal digital assistant.

51. The process control system of claim 37, wherein the portable computer takes input from any of a keyboard or mouse.

52. A portable computer for use in a control system that includes one or more control/sensing devices to monitor and/or control a process, the portable computer comprising
   A. a program that executes on the portable computer in order to configure it as a process controller for purposes of at least controlling the one or more control/sensing devices,
   B. the portable computer, when configured as a process controller, exchanging messages over a wireless network with a server digital data processor for purposes of controlling the one or more control/sensing devices,
   C. the messages including requests, transmitted by the portable computer to the server digital data processor, for services provided by the server digital data processor including services for at least one of (i) accessing information regarding the one or more control/sensing devices, (ii) updating information regarding the one or more control/sensing devices, (iii) determining a physical address associated with the one or more control/sensing devices, and (iv) providing notification of changes in at least selected information pertaining to the one or more control/sensing devices.

53. The portable computer of claim 52, wherein the messages include requests, transmitted by the portable computer to the server digital data processor, for services provided by the server digital data processor including services for at least one of (i) creating a named object that stores information regarding the one or more control/sensing devices, (ii) destroying such an object, (iii) accessing information in such an object, (iv) updating information in such an object, (v) determining, from an object name, a physical address associated with such an object, and (vi) providing notification of changes in at least selected information stored in such an object.

54. The portable computer of any claims 52 and 53, wherein the portable computer exchanges messages over the wireless network with the server digital data processor using a TCP/IP protocol.

55. The portable computer of any of claims 52 and 53, wherein said messages are in any of text and ASCII form.

56. The portable computer of any of claims 52 and 53, wherein the messages include requests to get a process variable associated with one or more of the control/sensing devices.

57. The portable computer of any of claims 52 and 53 which graphically displays information regarding one or more of the control/sensing devices.

58. The portable computer of any of claims 52 and 53 adapted to monitor and control one or more plant processes.

59. The portable computer of claim 58, adapted to facilitate the provision of technical support via the portable computer.

60. The portable computer of any of claims 52 and 53 adapted to provide remote access to one or more of said control/sensing devices for purposes of any of monitoring and controlling said one or more plant processes.

61. The portable computer of any of claims 52 and 53, wherein the messages include requests for one or more of said services in order to monitor one or more of said control/sensing devices.

62. The portable computer of any of claims 52 and 53, wherein the portable computer, when configured as a process controller, responds to input to transmit messages that include requests for one or more said services in order to get information reflecting the status of one or more of the control/sensing devices.

63. The portable computer of claim 62, wherein the portable computer displays gotten information reflecting the status of one or more control/sensing devices.

64. The portable computer of any of claims 52 and 53, wherein the portable computer is a personal digital assistant.

65. The portable computer of any of claims 52 and 53, wherein the portable computer takes input from any of a keyboard or mouse.

66. A digital data processor for use in a control system that includes one or more control/sensing devices to monitor and/or control a process, the digital data processor comprising
   A. a program that executes on the digital data processor in order to configure it as a process controller for purposes of at least controlling the one or more control/sensing devices,
   B. the digital data processor, when configured as a process controller, exchanging messages over a wireless network for purposes of controlling the one or more control/sensing devices,
   C. the messages including requests, transmitted by the digital data processor for object management services including services for at least one of (i) accessing information regarding the one or more control/sensing devices, (ii) updating information regarding the one or more control/sensing devices, (iii) determining a physical address associated with the one or more control/sensing devices, and (iv) providing notification of changes in at least selected information pertaining to the one or more control/sensing devices.

67. The digital data processor of claim 66, wherein the messages include requests for services including at least one of (i) creating a named object that stores information regarding the one or more control/sensing devices, (ii) destroying such an object, (iii) accessing information in such an object, (iv) updating information in such an object, (v) determining, from an object name, a physical address associated with such an object, and (vi) providing notification of changes in at least selected information stored in such an object.

68. The digital data processor of any claims 66 and 67, wherein the digital data processor exchanges messages over the wireless network using a TCP/IP protocol.

69. The digital data processor of any of claims 66 and 67, wherein said messages are in any of text and ASCII form.

70. The digital data processor of any of claims 66 and 67, wherein the messages include requests to get a process variable associated with one or more of the control/sensing devices.

71. The digital data processor of any of claims 66 and 67 which graphically displays information regarding one or more of the control/sensing devices.

72. The digital data processor of any of claims 66 and 67 adapted to monitor and control one or more plant processes.

73. The digital data processor of any of claims 66 and 67 adapted to provide remote access to one or more of said control/sensing devices for purposes of any of monitoring and controlling said one or more plant processes.

74. The digital data processor of claim 72, adapted to facilitate the provision of technical support via the digital data processor.

75. The digital data processor of any of claims 66 and 67, wherein the messages include requests for one or more of said services in order to monitor one or more of said control/sensing devices.

76. The digital data processor of any of claims 66 and 67, wherein the digital data processor, when configured as a process controller, responds to input to transmit messages that include requests for one or more said services in order to get information reflecting the status of one or more of the control/sensing devices.

77. The digital data processor of claim 76, wherein the digital data processor displays gotten information reflecting the status of one or more control/sensing devices.

78. The digital data processor of any of claims 66 and 67, wherein the digital data processor is a personal digital assistant.

79. The digital data processor of any of claims 66 and 67, wherein the digital data processor takes input from any of a keyboard or mouse.

80. A method of operating a digital data processor for use in a control system that includes one or more control/sensing devices to monitor and/or control a process, said digital data processor including a wireless network connection, the method comprising
   A. configuring the digital data processor as a process controller for purposes of controlling one or more of said control/sensing devices, and
   B. exchanging one or more messages in a form of any of text and ASCII format via said wireless network connection for purposes of effecting said controlling of said one or more said control/sensing devices.

81. The method of claim 80, wherein the digital data processor is any of a portable computer and a personal digital assistant.

82. The method of any of claims 80 and 81, wherein the digital data processor is battery-powered.

83. The method of claim 80, wherein the digital data processor operates without a wired network connection to the process control system.

84. The method of claim 80, wherein the digital data processor operates without a wired network connection to the process control system.

85. The method of claim 80, wherein step (B) includes exchanging over the wireless network messages that include requests, generated by the process controller, for managing objects within the control system, wherein those objects maintain information on the status of at least selected control/sensing devices.

86. The method of claim 85, wherein step (B) includes exchanging over the wireless network one or more messages for remotely managing shared objects of the control system.

87. The method of claim 85, wherein step (B) includes exchanging over the wireless network one or more messages for any of creating, registering, locating, accessing and/or updating said objects that maintain information on the status of at least selected control/sensing devices.

88. The method of claim 80, wherein step (B) includes exchanging over the wireless network one or more messages for any of (i) creating a named object that stores information regarding the one or more control/sensing devices, (ii) destroying such an object, (iii) accessing information in such an object, (iv) updating information in such an object, (v) determining, from an object name, a physical address associated with such an object, and (vi) providing notification of changes in at least selected information stored in such an object.

89. The method of claim 80, wherein step (B) includes exchanging over the wireless network one or more messages including requests to get a process variable associated with one or more of the control/sensing devices.

90. The method of claim 80, comprising executing a program on said digital data processor in order to configure it as a said processor controller.

91. The method of claim 80 comprising exchanging said messages over the wireless network using a TCP/IP protocol.

92. The method of claim 80, comprising exchanging one or more said messages in order to get information reflecting the status of one or more of the devices.

93. The method of claim 92, comprising graphically displaying information gotten by the digital data processor in response said one or more messages information reflecting the status of one or more of the devices.

94. The method of claim 80, comprising exchanging one or more said messages in order to set a value associated with one or more of the control/sensing devices.

95. The method of claim 80, comprising wherein the digital data processor is a personal digital assistant.

96. The method of claim 95, wherein the digital data processor is adapted to provide remote access to one or more of said control/sensing devices for purposes of any of monitoring and controlling said one or more plant processes.

97. The method of claim 80, comprising providing user input to the digital digital data processor via any of a keyboard or mouse.

98. The method of claim 80, wherein the digital data processor is adapted to monitor and control one or more plant processes.

* * * * *